United States Patent
Forster et al.

(10) Patent No.: US 9,922,456 B2
(45) Date of Patent: Mar. 20, 2018

(54) DEVICE AND METHOD OF SELECTING AN OBJECT FOR 3D PRINTING

(71) Applicant: Sony Interactive Entertainment Inc., Tokyo (JP)

(72) Inventors: Richard James Forster, London (GB); Andrew James Bigos, London (GB); Joseph Charles Boulter, London (GB); Neil Jonathan Brown, London (GB); Masakazu Suzuoki, Tokyo (JP); Masakazu Hayashi, Tokyo (JP); Norihiro Nagai, Tokyo (JP)

(73) Assignee: Sony Interactive Entertainment Inc. (JP)

( * ) Notice: Subject to any disclaimer, the term of this patent is extended or adjusted under 35 U.S.C. 154(b) by 44 days.

(21) Appl. No.: 15/084,725

(22) Filed: Mar. 30, 2016

(65) Prior Publication Data

US 2016/0314617 A1  Oct. 27, 2016

(30) Foreign Application Priority Data

Apr. 21, 2015 (GB) .................................. 1506778.8

(51) Int. Cl.
*G06T 17/00* (2006.01)
*G06T 17/10* (2006.01)
(Continued)

(52) U.S. Cl.
CPC .............. *G06T 17/10* (2013.01); *A63F 13/25* (2014.09); *A63F 13/63* (2014.09); *B33Y 50/00* (2014.12);
(Continued)

(58) Field of Classification Search
None
See application file for complete search history.

(56) References Cited

U.S. PATENT DOCUMENTS

2015/0172773 A1* 6/2015 Klappert .......... H04N 21/47815
                                                          705/26.5
2015/0258440 A1* 9/2015 Zhang ..................... A63F 13/00
                                                          463/31
(Continued)

FOREIGN PATENT DOCUMENTS

JP     2015104573 A    6/2015

OTHER PUBLICATIONS

Combined Search and Examination Report for Application No. GB1506778.8 dated Oct. 16, 2015.

*Primary Examiner* — Ryan M Gray
(74) *Attorney, Agent, or Firm* — Lerner, David, Littenberg, Krumholz & Mentlik, LLP

(57) ABSTRACT

Aspects of the technology include method of selecting an object from a videogame for 3D printing. The method involves periodically rendering a virtual environment of a videogame for display at a succession of points in time. Information is periodically recorded that enables visual reconstruction of at least part of the virtual environment at a succession of points in time. A predetermined set of values is periodically recorded responsive to the state of the rendered virtual environment at a succession of points in time. The predetermined set of values enables a model of a selected part of the rendered virtual environment to be generated that is configured for 3D printing.

15 Claims, 7 Drawing Sheets

(51) Int. Cl.
    *G06T 19/20*         (2011.01)
    *A63F 13/25*         (2014.01)
    *B33Y 50/00*         (2015.01)
    *A63F 13/63*         (2014.01)
    *B33Y 80/00*         (2015.01)
    *G06T 15/00*         (2011.01)

(52) U.S. Cl.
    CPC .............. *B33Y 80/00* (2014.12); *G06T 17/00* (2013.01); *G06T 19/20* (2013.01); *G06T 15/00* (2013.01)

(56) References Cited

U.S. PATENT DOCUMENTS

| | | | |
|---|---|---|---|
| 2015/0321427 A1* | 11/2015 | Gunnarsson | B29C 67/0088 700/98 |
| 2016/0132275 A1* | 5/2016 | Mackowiak | G06F 3/1206 463/32 |
| 2016/0185043 A1* | 6/2016 | Klappert | B29C 67/0088 264/40.1 |

* cited by examiner

DEVICE AND METHOD OF SELECTING AN OBJECT FOR 3D PRINTING

CROSS REFERENCE TO RELATED APPLICATION

The present application claims the benefit of and priority to GB Patent Application No. 1506778.8, filed Apr. 21, 2015, the entire disclosure of which is hereby incorporated by reference herein.

BACKGROUND

Field

The present disclosure relates to a device and method of selecting an object for 3D printing.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

3D printing is a means of volumetric printing, where instead of depositing two-dimensional pixels on a flat surface, the printer deposits three-dimensional voxels within a volume. There are numerous technologies to achieve this, including the use of lasers to melt and fuse materials such as metal powder in incremental layers to build a structure, or the use of a high-temperature print-head to deposit small droplets of plastic that cool and harden to build up a 3D model.

The design for such a 3D model is typically generated in a computer-aided design program, in which a user defines surfaces and volumes of a virtual model. A drawing list is then generated by the program specifying the order in which to fuse or deposit materials to render the virtual model using the 3D printer.

This approach has resulted in the creation of many aesthetically and functionally unique objects, some of which are difficult to make using conventional processes. However the utility of 3D printers has still not been fully explored.

In particular, it may be desirable to capture dynamically generated or animated 3D models, such as those found in videogames, at a particularly memorable or significant point in time during gameplay.

The present disclosure aims to provide such a new use for 3D printers.

In a first aspect, a method of selecting an object from a videogame for 3D printing is provided according to claim 1.

In another aspect, a method of selecting an object from a videogame for 3D printing is provided according to claim 2.

In another aspect, a videogame hosting device is provided according to claim 10.

In another aspect, a computing device is provided according to claim 14.

Further respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A device and method of selecting an object from a videogame for 3D printing are disclosed. In the following description, a number of specific details are presented in order to provide a thorough understanding of the embodiments of the present disclosure. It will be apparent, however, to a person skilled in the art that these specific details need not be employed to practice the present disclosure. Conversely, specific details known to the person skilled in the art are omitted for the purposes of clarity where appropriate.

In an embodiment of the present disclosure, an entertainment device is operably coupled to a 3D printer. The entertainment device is arranged in operation to capture snapshots of videogame play for replication by the 3D printer, as explained later herein.

Entertainment Device

An example of a suitable entertainment device is the Sony® Playstation 4® device.

Figure 1:
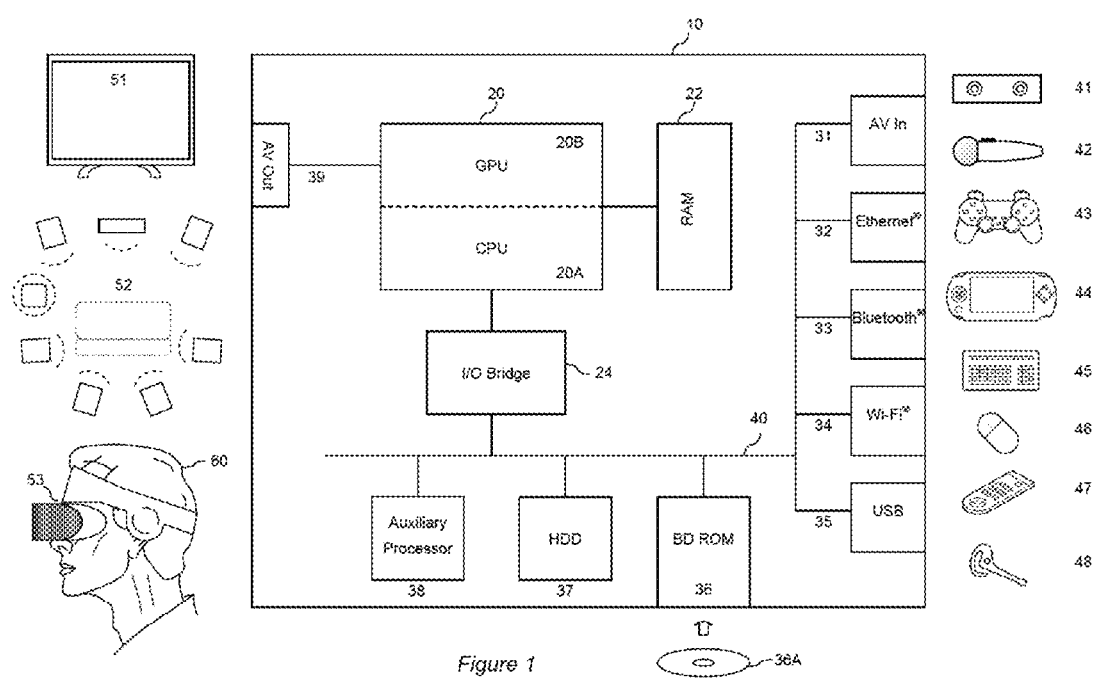
FIG. 1 is a schematic diagram of an entertainment device in accordance with embodiments of the present disclosure.

FIG. 1 schematically illustrates the overall system architecture of the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye® or PS Camera®; wand-style videogame controllers 42 such as the PlayStation Move® and conventional handheld videogame controllers 43 such as the DualShock 4®; portable entertainment devices 44 such as the PlayStation Portable® device and PlayStation Vita® device; a keyboard 45 and/or a mouse 46; a media controller 47, for example in the form of a remote control; and a headset 48. Other peripheral devices may similarly be considered such as a phone or tablet, printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60. The head mounted display unit may have integral headphones, attachable headphones/earbuds, or rely on separate audio being supplied to the user.

In more detail, regarding processing, the CPU 20A may comprise two 64-bit quad core modules, based for example on the 'Jaguar' CPU architecture by AMD®, for a total of eight cores. Each core may use a base clock speed of 1.6 GHz. The GPU 20B may comprise 18 compute units each comprising 64 cores, for a total of 1152 cores. The GPU may be based for example on the Radeon® GCN architecture by AMD®. The GPU cores may be used for graphics, physics calculations, and/or general-purpose processing.

Regarding storage, the system RAM 22 may comprise 8 GB RAM, for example in 16 blocks of 512 MB GDDR5 unified system memory, and is shared by the CPU and GPU. Meanwhile the hard disk may be a 500 GB hard drive. Optionally the hard drive is mounted so as to be replaceable by a user of the system unit. The Blu-ray® drive may read data from Blu-ray discs at multiples of the standard reading speed. The Blu-ray drive may be operably coupled to a hardware-implemented so-called 'zlib' decompression module. The auxiliary processor may be provided with its own local memory, such as for example 256 MB of DDR3 SDRAM.

Regarding communication, the system unit 10 may comprise 802.11 b/g/n Wi-Fi® 34; 10Base-T, 100BASE-TX and 1000BASE-T Ethernet®32; Bluetooth 2.1®33 and one or more USB 3.0 ports 35. The system unit may receive video and optionally audio via AV input 31. Similarly the system unit may output video and optionally audio via AV output 39 or via Bluetooth®, Wi-Fi® or USB.

Regarding peripherals, the system unit is typically provided with at least one hand-held controller 43 such as the DualShock 4®. This controller may be used to interact with user interfaces presented by the system unit that are associated with the operating system and/or a particular game or application being run by the system unit.

The user may also interact with the system unit using a video camera 41 such as the PlayStation Eye®. This may provide monoscopic or stereoscopic video images to the system unit 10 via for example AV input 31. Where these images capture some or all of the user, the user may enact gestures, facial expressions or speech as appropriate to interact with the currently presented user interface.

Alternatively or in addition, a controller designed to assist with camera-based user interaction, such as the PlayStation Move® 42, may be provided. This controller has a wand form factor and an illuminated region that facilitates detection of the controller within a captured video image. Illuminated regions may similarly be provided on other controllers 43, such as on the DualShock 4® device. Both kinds of controller comprise motion sensors to detect transverse movement along three axes and rotational movement around three axes, and wireless communication means (such as Bluetooth®) to convey movement data to the system unit. Optionally such controls can also receive control data from the system unit to enact functions such as a rumble effect, or to change the colour or brightness of the illuminated region, where these are supported by the controller.

The system unit may also communicate with a portable entertainment device 44. The portable entertainment device 44 will comprise its own set of control inputs and audio/visual outputs. Consequently, in a 'remote play' mode some or all of the portable entertainment device's inputs may be relayed as inputs to the system unit 10, whilst video and/or audio outputs from the system unit 10 may be relayed to the portable entertainment device for use with its own audio/visual outputs. Communication may be wireless (e.g. via Bluetooth® or Wi-Fi®) or via a USB cable.

Other peripherals that may interact with the system unit 10, via either wired or wireless means, include a keyboard 45, a mouse 46, a media controller 47, and a headset 48. The headset may comprise one or two speakers, and optionally a microphone.

Regarding output, the GPU typically generates a 1080p high definition image to the AV output 39. The frame rate of these images may vary. The image is typically conveyed to a television 51 via a standard HDMI connection, optionally via an AV receiver (not shown). Where the television supports stereoscopic display, and optionally in response to a command from the user, the 1080p high definition may be formatted as a stereoscopic image for example using a left-right side-by-side format. The television will then split the image in two and interpolate each half to full width for respective presentation to the user's left and right eyes, either by use of specially adapted glasses or by use of directed light paths from an autostereoscopic display.

Optionally in conjunction with an auxiliary audio processor (not shown), the APU 20 generates audio for output via the AV output 39. The audio signal is typically in a stereo format or one of several surround sound formats. Again this is typically conveyed to the television 51 via an HDMI standard connection. Alternatively or in addition, it may be conveyed to an AV receiver (not shown), which decodes the audio signal format and presented to a home cinema system 52. Audio may also be provided via wireless link to the headset 48 or to the hand-held controller 43. The hand held controller may then provide an audio jack to enable headphones or a headset to be connected to it.

Finally, the video and optionally audio may be conveyed to a head mounted display 53 such as the Sony Morpheus® display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device defaults to an operating system such as Orbis OS®, a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Upon start-up, respective users are asked to select their respective accounts using their respective controllers, so that optionally in-game achievements can be subsequently accredited to the correct users. New users can set up a new account. Users with an account primarily associated with a different entertainment device can use that account in a guest mode on the current entertainment device.

Once at least a first user account has been selected, the OS may provide a welcome screen displaying information about new games or other media, and recently posted activities by friends associated with the first user account.

The OS then provides a series of icons for the user to select amongst, for example in the form of two parallel horizontal rows. In this example the content of the top row may be fixed and relate to operating system features, whilst the bottom row may be at least in part dynamically assembled to relate to recent activities, such as providing launch icons for the most recently played or downloaded games.

The top row of icons may provide access to screens relating to an online store; notifications; friends; text chat; voice chat; user account profile; trophies; system settings; and/or power management.

When selected, the online store may provide access to games and media for download to the entertainment device. A welcome screen may highlight featured content. Where an online subscription service is provided (Such as so-called 'PS Plus'), then content or prices exclusive to that service may be provided in addition to standard content or prices. The store may also provide means to pay money into an online account for purchasing content, and may provide a record of purchases, enabling a user to download a purchased item of content at a later date or multiple times (for example after choosing to swap to a larger hard disk).

The notifications screen provides information about new trophies; game alerts (for example relating to special online events); game invites from friends; download and/or update status for content, and upload status for content being shared.

The friends screen allows a user to view all their friends or filter them according to who is currently online; additionally a user can review a list of other users they have met within games or other multi-user applications of the entertainment device, and optionally send such a user a friend request or conversely block a user to avoid encountering them again. In addition, optionally a user can request that a friend allow them to see their real name; subsequently they can also contact this friend via other social media such as Facebook®, optionally via a built-in interface.

Text chat provides a means to send messages to friends and other users of the entertainment device's network. Meanwhile voice chat provides a means to invite a group of friends to share an audio channel over the entertainment device's network so that they can chat to each other, for example whilst playing a game.

The account user profile screen allows a user to review statistics relating to their activities with the entertainment device. The screen also provides means to configure the user's appearance on the network, such as selecting an avatar to be associated with their username.

The trophy screen allows a user to view their trophies and in-game progress; trophies may be organised on a game-by-game basis. A user's trophies or other performance statistics may be compared with those of their friends to identify the friend with the closest better performance statistic in a game, so as to encourage the user to play further or improve their play of the game.

The system settings screen provides access to further menus enabling the user to configure aspects of the operating system. These include setting up an entertainment device network account, and network settings for wired or wireless communication with the Internet; the ability to select which notification types the user will receive elsewhere within the user interface; login preferences such as nominating a primary account to automatically log into on start-up, or the use of face recognition to select a user account where the video camera 41 is connected to the entertainment device; parental controls, for example to set a maximum playing time and/or an age rating for particular user accounts; save data management to determine where data such as saved games is stored, so that gameplay can be kept local to the device or stored either in cloud storage or on a USB to enable game progress to be transferred between entertainment devices; system storage management to enable the user to determine how their hard disk is being used by games and hence decide whether or not a game should be deleted; software update management to select whether or not updates should be automatic; audio and video settings to provide manual input regarding screen resolution or audio format where these cannot be automatically detected; connection settings for any companion applications run on other devices such as mobile phones; and connection settings for any portable entertainment device 44, for example to pair such a device with the entertainment device so that it can be treated as an input controller and an output display for so-called 'remote play' functionality.

The entertainment device network account may be set up to include the user's real name and optionally other personal details, bank details for online payments, an indication of whether the current entertainment device is the primary entertainment device associated with the user account, and the ability to selectively transfer licenses between entertainment devices where the user account is associated. Additionally a user may provide user account information for other services for which access may be integrated into the operating system, such as Facebook® and Twitter®; this enables easy sharing of the user's activities with friends who may not be on the entertainment device network but are on other social networks.

The power management icon allows the user to turn the device off. Optionally it may provide a timer for the entertainment device to turn off within a after a predetermined time unless the user intervenes.

The bottom row of the menu may show icons for recently played games, enabling quick access. Optionally selection of a game icon provides a summary of game progress and any relevant statistics, and where appropriate information such as progress and commentary from friends who have also played or are playing the game. Other information regarding the game may also be provided such as details of recently applied updates, or links to downloadable content associated with the game that is available in the online store.

The bottom row may also provide access to other media sources such as a web browser, television and music media applications, and any live streaming service provided by the entertainment device network. Additionally an icon may be provided to access the full library of content on the device, such as games that have not been recently played.

The user interface of the operating system may also receive inputs from specific controls provided on peripherals, such as the hand-held controller 43. In particular, a button to switch between a currently played game and the operating system interface may be provided. Additionally a button may be provided to enable sharing of the player's activities with others; this may include taking a screenshot or recording video of the current display, optionally together with audio from a user's headset. Such recordings may be uploaded to social media hubs such as the entertainment device network, Twitch®, Facebook® and Twitter®.

3D Printer

As was noted previously, the entertainment device is operably coupled to a 3D printer.

It will be appreciated that there are numerous technologies for 3D printing that are typically differentiated by how layers are built up to create a model. One technology is known as selective laser sintering (SLS), where a layer of powder is selectively fused together by a laser to create solid regions; a new layer of powder is then placed on top and the process repeats to build the model. Another technology is known as stereolithography, and uses a photo-reactive liquid in conjunction with one or more lasers to harden the liquid at defined points, thereby building the model, again typically in layers. Whilst both of these techniques are envisaged within the scope of embodiments of the present disclosure, they have the disadvantage of requiring both powerful lasers and large volumes of matrix material in the form of powder or liquid around the model, which make them less practical for domestic use. Consequently a preferred technology is fused deposition modelling (FDM). This approach melts plastic in a printer head that moves over successive layers of the model, depositing droplets of plastic at selective positions in each layer in a manner similar to the deposition of droplets of ink by an injet printer on a sheet of paper. This avoids the need for lasers or a surrounding matrix of the raw material used by the model. Accordingly for the purposes of understanding an FDM 3D printer is briefly described herein with reference to FIGS. 2A and 2B.

Figure 2A:
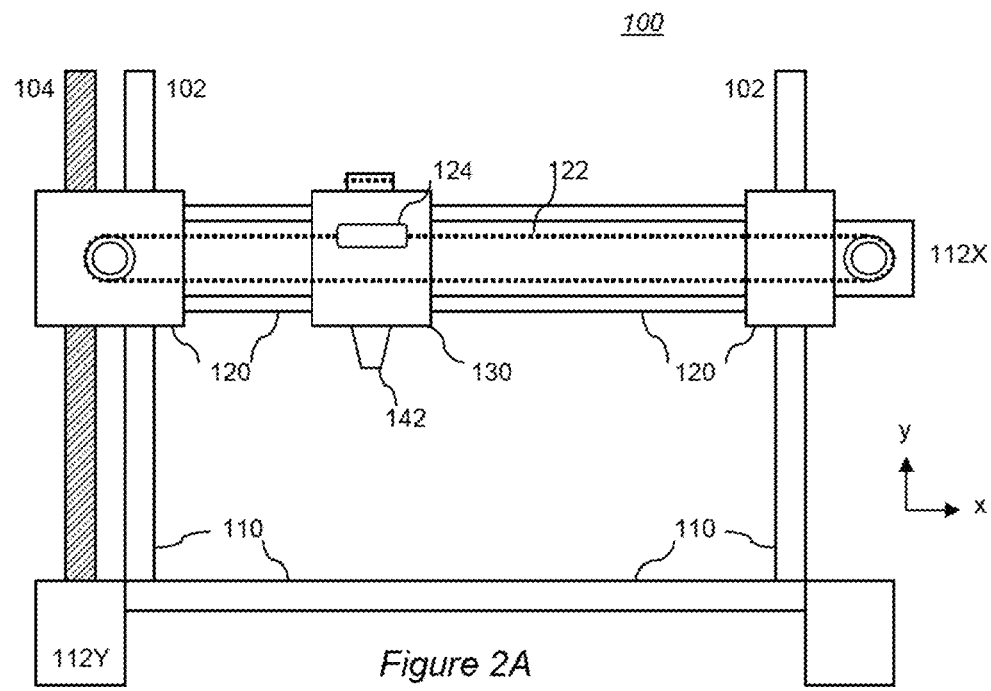
FIG. 2A is schematic diagram of a side elevation of a 3D printer in accordance with embodiments of the present disclosure.
Figure 2B:
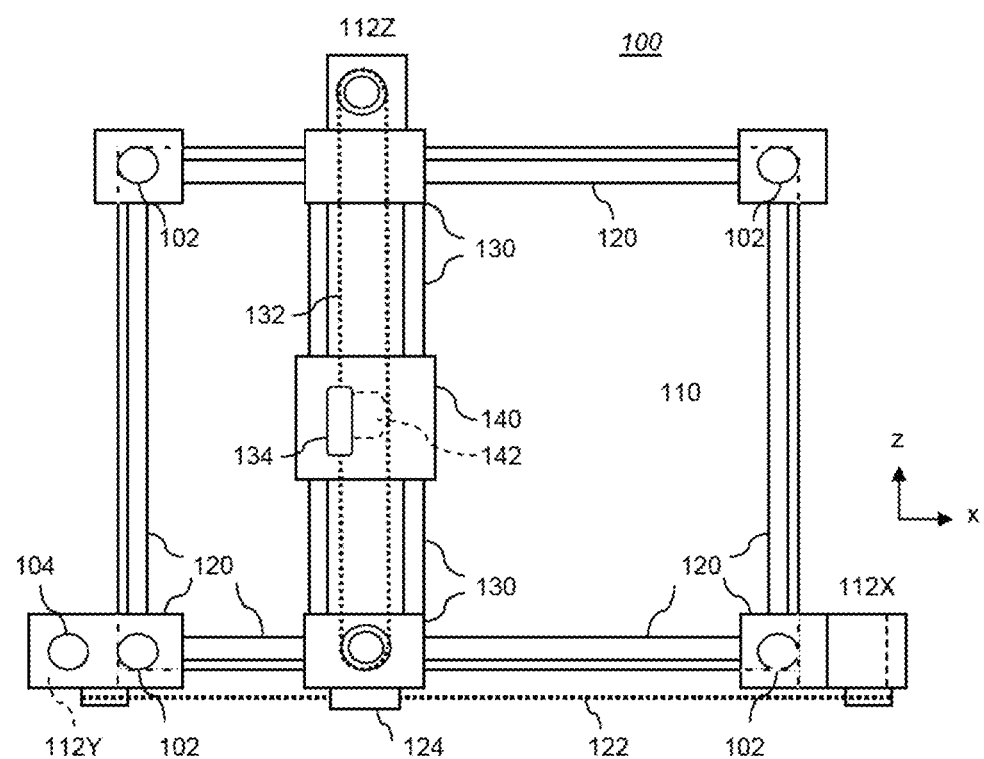
FIG. 2B is schematic diagram of a plan view of a 3D printer in accordance with embodiments of the present disclosure.

FIG. 2A shows a side elevation of a simple FDM 3D printer 100, whilst FIG. 2B shows a plan view of the same FDM 3D printer. The printer 100 comprises a base structure 110 that provides a working surface for assembly of the printed model and support struts 102 upon which a printer frame 120 can be raised and lowered.

In an example mechanism, a motor 112Y is coupled to a drive bar 104 comprising a screw thread; a printer frame 120 then comprises a coupling section with a threaded hole and a smooth hole, the threaded hole being engaged with the drive bar and the smooth hole being engaged with one of the support struts. When, under instruction from a printer driver, the motor 112Y turns the drive bar in a clockwise or anticlockwise direction, the printer frame is moved up or down the drive bar and support strut (i.e. along the y-axis) and hence raises or lowers a printer carriage 130 attached to it.

As can be seen from FIG. 2B, the printer frame 120 is typically mounted on four support struts 102. Optionally a second motor, drive bar and coupling section may be provided at an opposing corner of the frame, to reduce strain on the frame and the motor.

The printer frame 120 supports the printer carriage 130. A motor 112X is coupled to a drive band 122 that is fixed by fixing means 124 to the printer carriage 130. When, under instruction from a printer driver, the motor 112X rotates the drive band clockwise or anticlockwise, the printer carriage 130 is moved right or left along the printer frame 120 (i.e. along the x-axis) and hence moves an attached printer mechanism 140 laterally.

The printer carriage 130 supports the printer mechanism 140. A motor 112Z is coupled to a drive band 132 that is fixed by fixing means 134 to the printer mechanism 140. When, under instruction from a printer driver, the motor 112Z rotates the drive band clockwise or anticlockwise, the printer mechanism 140 is moved in or out of a depth direction (i.e. along the z-axis).

The printer mechanism 140 itself comprises heating means for heating the end of one or more plastic threads fed into the mechanism (not shown), or for heating grains of plastic powder obtained from a hopper on the mechanism (not shown). The heating of the plastic or alternatively the release of heated plastic is controlled by instruction from a printer driver. A resulting bead or droplet of melted plastic is then deposited onto the working surface 110 of the printer or a partially built model (not shown) as applicable, through the printer head or nozzle 142.

In this way, under suitable instruction from a printer driver, the printer head can be positioned anywhere within a working volume of the 3D printer using motors 112X, Y, Z, and a droplet of plastic can be deposited at that position, which then cools and hardens to form a voxel of a 3D model. Through successive movement of the printer head and selective melting or release of plastic droplets, a completed 3D model can thus be built from a plurality of such voxels.

Typically the printer driver itself is a software module in a computer-aided design system that receives model geometry describing the 3D model. The printer driver then generates thin slices of the 3D model one voxel thick for each layer in the y direction, and determines the x, z coordinates for each voxel in that layer. The printer driver then outputs a sequence of instructions to the printer 100 to move the printer head 142 to the respective x, z coordinate for each voxel in layer y, where the printer mechanism is instructed to heat and/or release a droplet of plastic to form a voxel at that position. In this way the digital 3D model is rebuilt as a physical model by the 3D printer.

In an embodiment of the present disclosure, the printer driver is incorporated into the videogame, or the operating system of the entertainment device, or a middleware library of support functions used by either the videogame or the operating system.

Virtual Environment

Figure 3A:
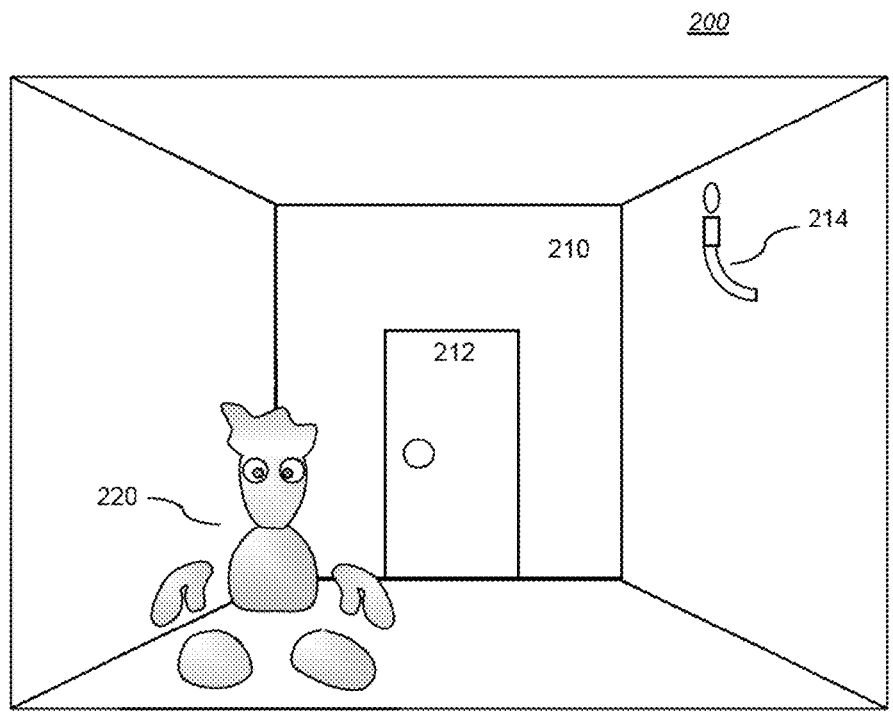
FIG. 3A is a schematic diagram of a videogame virtual environment in accordance with embodiments of the present disclosure.

Referring now to FIG. 3, a videogame running on the entertainment device comprises a virtual environment in which typically a plurality of entities or environmental elements are dynamically viewed as the user changes the position of viewpoint and as entities or elements of the game enact scripted activities or react to the user's behaviour, or a mixture of both.

In FIG. 3, a simple environment 200 is illustrated comprising a room 210 with a door 212; on one wall there is mounted a candle in a candleholder 214. In the room is the player's character 220 (here illustrated for example by the fictitious game character Blobman).

The virtual environment is constructed in 3D from geometry data, typically in the form of polygons defining a surface of an object. These polygons may be predefined for example in the case of static objects and background scenery, or may be warped/repositioned or procedurally generated in the case of mobile entities within the environment such as the player's character. It will be appreciated that references herein to 'polygons' encompasses preliminary geometrical features such as vertices, from which polygons are built, where these are used in the graphics pipeline. Similarly, voxel rendering uses equivalent geometric features to describe objects. Hence processes described as applying to polygons may be applied in whole or part to such other geometrical features as appropriate.

The virtual environment is then prepared for presentation to the user from a selected viewpoint. Elements of the environment that have line of sight to the user are patterned with texture information appropriate to the object they represent, and the textured geometry is further processed for lighting effects, such as variations in brightness from virtual light sources, and bump mapping (or similar techniques such as displacement mapping or use of an isosurface) to simulate how the texture should interact with such a virtual light source. Additionally other effects such as volumetric fog and particle effects may be included.

The final rendered image is then presented to the user, typically via a 2D or 3D television or via a head mounted display.

Often within such games, the user has an experience that they wish to share with friends and/or the wider world. To this end, as noted previously an entertainment device such as the PlayStation 4® can have a 'share' button on its controller to facilitate a capture of the image presented to the user, which can then be uploaded to a sharing site such as a social media site.

Printing a 3D Model of the Environment using Supplementary Geometry

In an embodiment of the present disclosure, the user is provided with the option to select a moment within the game from which to create a 3D printed model. In this way, the user can create tangible mementos of their in-game experiences.

It will be appreciated that in-game geometry (vertices, polygons and the like) may be suitable to drive a 3D printing process. For example, the simple block-based environment within Minecraft lends itself to being rendered by a 3D printer.

However, this is the exception rather than the rule. A particular appeal of video games is their ability to present environments and characters that are not bound by the normal rules of physics. In particular, objects may exist in a predetermined relationship to each other without having physical connections (as exemplified by the character 'Blobman' in FIG. 3A, whose hands and feet are not physically attached to his torso in this figure), whilst other objects may be defined only in two dimensions within the three-dimensional environment, such as curtains, capes and in many cases environmental components such as walls. This is because physical strength is not a requirement of the environment, where program rules prevent movement beyond certain boundaries, and the walls are simply decorative surfaces for textures demarcating those boundaries.

Hence a virtual environment may comprise several bounding surfaces that have zero thickness, upon which are placed physical objects, some of which may additionally be unstable in the real world. An example of such bounding surfaces may be the walls of the room 210 in the virtual environment 200 of FIG. 3.

It is not feasible to print such a virtual environment using a 3D printer.

Supplementary Geometry

Accordingly, in an embodiment of the present disclosure, supplementary printer geometry is provided that is used to modify elements of the environment that are unsuited to 3D printing.

Figure 3B:
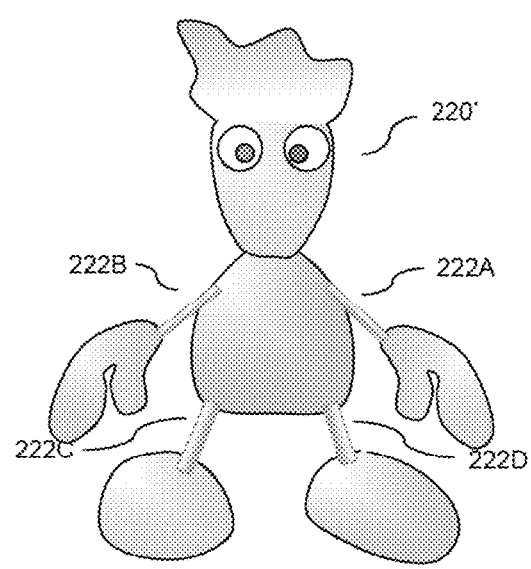
FIG. 3B is a schematic diagram of a videogame character model for 3D printing in accordance with embodiments of the present disclosure.

Referring now to FIG. 3B, in one embodiment, the supplementary printer geometry is defined by the game developer in a similar manner to conventional game geometry. For example, supplementary printer geometry for the character 'Blobman' may comprise rods 222A,B,C,D to connect the legs and arms to the character's torso, making the modified 3D character 220' a contiguous body suitable for 3D printing.

The supplementary printer geometry may replicate some or all of the existing in-game geometry in addition to the elements that support 3D printing, or may only comprise the elements that support 3D printing, with the combined supplementary and in-game geometry being used for 3D printing. Alternatively or in addition in some cases a partial replacement of in-game geometry may be used, for example to replace a sharp point on a sword or a stiletto heel with a rounded or broad surface, either for safety reasons or to provide a better bond for the object to its supporting surface when it is 3D printed.

Hence more generally the in-game geometry is supplemented by, and optionally at least partially replaced by, supplementary printer geometry for 3D printing that takes account of the physical requirements of the printing process and of the completed model under the effect of gravity.

Consequently when a user pauses the game and selects a 3D snapshot for printing, the environment is modified using the 3D printing-compatible supplementary printer geometry, before the drawing list required by the printer is output either directly to a printer or to a file for subsequent use by the printer driver.

Similarly, supplementary printer geometry for 2D elements of the environment may be defined that has the thickness needed to provide adequate structural support for the environmental feature when 3D printed.

It will be appreciated that where the 3D model can also be coloured during construction, either by the application of ink or by the selection of different coloured plastics, then the textures used for the video game geometry can also be used to drive the colouring process for the model.

It will also be appreciated that the textures can also be used for the supplementary printer geometry to the extent that the in-game and supplementary geometries match. However, for elements of the supplementary printer geometry not found in the rendered game (such as the connecting rods in the 'Blobman' example above), either supplementary textures may be provided, or textures may be extrapolated from the existing textures, or no texture may be used. In the case that textures are extrapolated, optionally the texture may be extrapolated from the portion of the environment supporting an element against gravity (e.g. the ground, or in the case of Blobman, from the feet to the torso, and from the torso to the hands and head, respectively), as this is likely to create the most unobtrusive supporting structure within the model. Alternatively in the case of using no texture, the bare plastic (or other 3D printer material) is left exposed, making it clear to the viewer that this is a functional support that is not part of the original image. Which approach is preferred may be an artistic decision for the user or developer.

To limit the burden on developers, this supplementary printer geometry may be provided only in key areas of the game, for example where a particular puzzle is solved or a boss has been defeated. The option to create a 3D snapshot will thus only be enabled within the supported areas. Optionally in such areas additional 'bonus' geometry may be provided, such as exclusive victory poses that the user can select for their character to use within the 3D printed version of the environment.

However it will be appreciated that the supplementary printer geometry places a development burden on developers, and imposes a trade-off between the flexibility to print mementos of the in game experience and the amount of additional geometry that needs to be defined to support this ability. It will be preferable to increase the number of environments where this is possible whilst mitigating the burden on the developer.

Printing a 3D Model of the Environment from a Collection of Images

In an embodiment of the present disclosure, the user is again provided with the option to select a moment within the game from which to create a 3D printed model. In this way, the user can create tangible mementos of their in-game experiences.

In an embodiment of the present disclosure, when the entertainment device receives an input indicating that a user wishes to create a 3D print of the current scene, the game state is frozen (e.g. paused) so that it can be analysed for 3D printing.

It will be appreciated that the in-game geometry, which might be considered a likely source of information for a 3D model, may be a mix of polygons, skeletal models, skin models, bump maps and physics derived procedural models or deformations to models, etc., that are typically only combined in one place, and in one format, which is when they are rendered for display on screen.

Consequently, in an embodiment of the present disclosure, a 3D model is constructed for 3D printing using these rendered images in preference to the potentially disparate in-game representations of the virtual environment geometry. However, a single rendered image will typically comprise insufficient information to fully model the virtual environment for 3D printing.

As was noted previously herein, during normal play the virtual environment is rendered for a particular viewpoint. Furthermore To enable high frame rates and efficient processing, then as part of this rendering process elements of the environment that are not visible from that particular viewpoint are culled early in the rendering process.

Consequently only the elements of the environment visible from the selected viewpoint are preserved and rendered. If one were to generate a 3D printer model of the environment using this render, then all aspects of the model that were not visible from that particular viewpoint would be missing or would have to be filled in using some form of interpolation algorithm. Clearly this would give rise to unsatisfactory results when the real printed model was viewed from any other angle.

Accordingly, in an embodiment of the present disclosure, while the game state is frozen the entertainment device generates a plurality of rendered images of the virtual environment from different viewpoints.

Preferably at least two opposing viewpoints are rendered, with the first viewpoint typically being the one originally displayed to the user. Between the two images, this results in the rendering of most if not all of the elements of the environment culled in the original rendered view.

Optionally three viewpoints are rendered, preferably equally distributed on a plane, with the first viewpoint being the one originally displayed to the user and the plane being horizontally centred on the direction of view of that first viewpoint. Again this results in the rendering of most if not all of the elements of the environment culled in the original rendered view, but is likely to capture more elements of the environment that may have been occluded by objects both in front and behind them and hence not rendered in either of the two viewpoints mentioned above.

More generally, as more viewpoints are distributed on the plane, fewer elements of the environment remain un-rendered. For example, the entertainment device may conduct a 'fly-by' within the environment, capturing N images, where N is for example between 2 and 360. The number of images captured is a trade-off between fidelity of the eventual model and the memory and processing capacity of the entertainment device needed to analyse the captured images (as discussed later herein).

Optionally, one or more viewpoints looking down from above the virtual environment may also be rendered (either as individual images or as part of a flyby sequence) to provide additional detail for those elements of the environment that are substantially parallel to the previously captured viewpoints on a single plane, such as the top surfaces of some environmental features.

In an embodiment of the present disclosure, metadata relating to the position and viewing direction of the virtual camera representing the viewpoint for each image is also recorded and associated with the respective image.

It will be appreciated that the virtual environment may represent a large area, whereas the 3-D model will encompass a limited area determined by the size of models that can be generated by a particular 3-D printer and the scale at which the environment is printed. Preferably the properties of the particular 3-D printer are known if it is in communication with the entertainment device (otherwise, a default model size may be assumed or the user may stipulate a size); similarly the scale at which the environment is printed may be selected by the user or may be automatically determined with reference to a key character within the environment, such as the user's avatar. This avatar may be chosen to be a particular size within the final 3-D printer model (as a nonlimiting example, 5 cm tall by default), and the extent of the environment to be printed at the same scale may thus be calculated. Alternatively, in a 'character print' mode, only a particular character, such as the user's avatar, may be printed, without surrounding in-game environmental features. This may be of particular value for cases where the user is allowed to customise their own in-game character, and becomes emotionally attached to it.

The equidistant distribution of two or more viewpoints may thus be centred on this key character, and may optionally use any in-game camera control logic to determine the necessary direction of view needed to centre the key character within each captured image.

Where the game presents a first-person view, then based upon the model size and an assumed or user-set scale, the centre point of the model can be calculated and the viewpoints can be distributed around it.

Combining the above approaches, the entertainment device may capture images by selecting sample points on a sphere of predetermined radius, and which is centred on that centre point. Optionally those sample points that are occluded by an environmental barrier (such as a point on the sphere below the ground or inside a mountain) may either be skipped, or the radius of the sphere may be locally reduced until the surface is no longer occluded by the environmental barrier. The sampling scheme may initially select viewpoints on the above mentioned plane comprising the original viewpoint and centre point and parallel to the horizontal axis of the original viewpoint, before optionally selecting one or more viewpoints on the sphere above this plane, and optionally one or more viewpoints on the sphere below this plane. The predetermined radius may be equal to the distance between the original viewpoint and the determined centre point of the model, to maintain consistency with the original captured image, or the original image and the subsequent additional image(s) may be re-rendered at a different effective radius, for example a minimum radius at which the field of view of the image encompasses the ground area that will be included in the 3D printed model. Notably, traditionally games use lower-fidelity models at greater draw distances to simplify the rendering process. Therefore optionally the radius may be constrained to a maximum distance equal to a rendering distance at which the game would select a lower-fidelity model of a key element of the image (such as the user's avatar). Further optionally, this may be overridden by a user for aesthetic purposes or because they wish to ensure that a particular environmental feature or combination of features is included in the final model. This may be of particular value for cases where the user is allowed to customise the environment, for example by creating so-called 'mods'.

In any event, the result is a set of images capturing two or more complimentary viewpoints of the virtual environment for a given game state.

It will be appreciated that the above image capture procedure may be controlled by the entertainment device. However, alternatively or in addition the user may capture images of the same scene from one or more different viewpoints by selecting these viewpoints themselves and using a conventional image capture process. These viewpoints may not correspond to the preferred distributions discussed previously herein. It will similarly be appreciated that images of the same scene from different viewpoints can be captured by different users at different times on different entertainment devices; providing a user has access to a pooled set of images (for example if they are posted to an online forum, or are stills extracted from a 'fly-by' video that moves or changes viewpoints, such as may be included in a trailer video for the videogame) then an equivalent set of two or more complementary viewpoints of the virtual environment may be obtained.

Given these images and optionally associated metadata relating to the viewpoint position and direction, an entertainment device can analyse these images to generate 3-D model data.

Several analysis techniques may be used, optionally in a complementary manner.

Silhouette analysis uses the edges of objects within the captured images to estimate the object's profile local to that edge. The object profile can then be extruded orthogonal to the profile for each viewpoint until it intersects with another extruded profile (typically extruded from another viewpoint), to create an approximation of the object's shape. It will be appreciated that as the number of viewpoints increases according to the scheme described previously herein, each extrusion will subtend a smaller angle around the object, resulting in a more accurate overall model of the object.

Stereoscopic analysis uses the relative displacement of the same objects within two overlapping viewpoints to calculate their distance from the or each viewpoint. From this information, a depth map can be constructed that is indicative of the 3D shape of the object in the region visible to both viewpoints. Hence again where more viewpoints are available, successive pairs of viewpoints can be used to build a map of the surface of a viewed object.

In either case, where there is no viewpoint information, this may be estimated by correlating environmental features between images, and selecting viewpoint positions and directions that provide the best correlation for the relative positions of these features.

It will be appreciated that silhouette analysis and stereoscopic analysis can be used to complement each other. For example the two techniques can be used to detect errors in each other's models; where the two techniques generate estimates of an object surface that differ by a threshold amount, the estimate that most closely matches an interpolation between nearby estimates of the object surface from the two techniques that are within a threshold agreement may be used, with the other estimate being discarded. Optionally, such areas of the model may also be highlighted for inspection and/or editing by the user prior to printing, as discussed later herein.

The above techniques are particularly useful where the image data is obtained from third parties (for example from screenshots on a forum), and there is no additional metadata available.

However, in the case of images generated and captured by the entertainment device, it is possible to also capture associated depth information generated by the entertainment device itself. As was noted previously, during a conventional render of a viewpoint, elements of the environment that are occluded from the rendered view are culled. This occlusion is determined, at least in part, by the relative distance of objects in the environment from the virtual camera; for example objects that are behind other objects are deemed to be occluded and thus culled. These distances are calculated by the entertainment device for this purpose. This means that there is an accurate and per-pixel (or even sub-pixel) resolution distance or 'depth' map available for each captured image.

In an embodiment of the present disclosure, this depth map is also captured and associated with each image captured by the entertainment device for use in the generation of the 3D model. In principle, this information can be obtained in a manner that is transparent to the operation of the renderer by copying the so-called z-buffer used when generating the image. Consequently the image capture process does not require modification of a game rendering engine.

Figure 4:
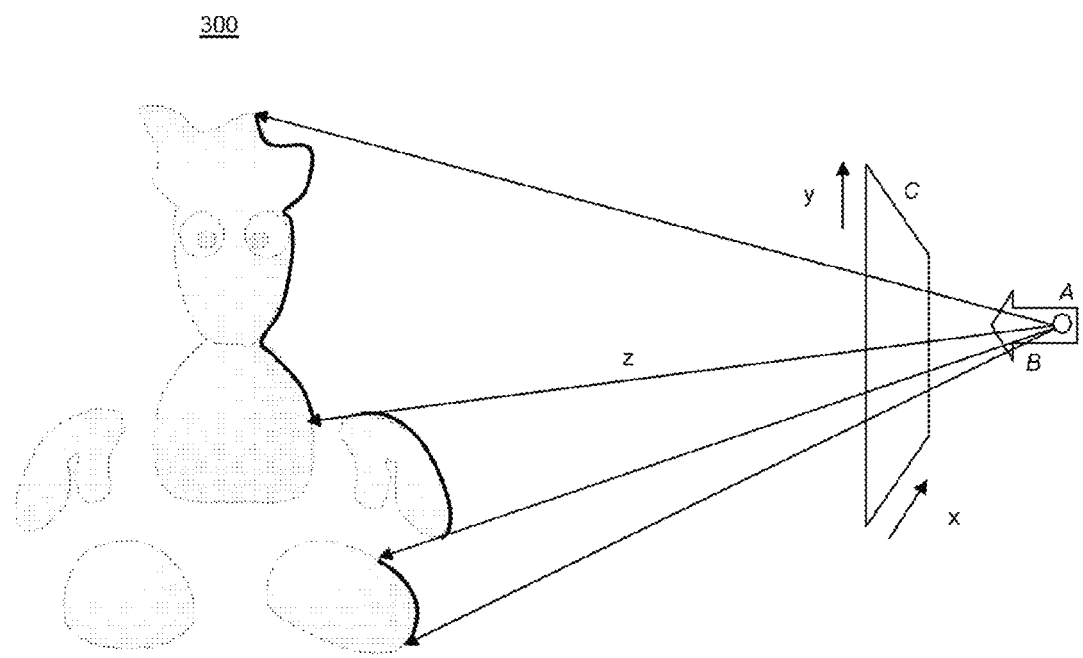
FIG. 4 is a schematic diagram of a projection in to a 3D model space in accordance with embodiments of the present disclosure.

Referring now to FIG. 4, given information regarding the position A and viewpoint direction B of each image, together with the associated distance information z, the pixels of each image can be projected to respective points within a shared virtual modelling space 300. In effect, each pixel is displaced from the position A of the image viewpoint by amount x,y,z in a co-ordinate scheme local to the image (but which may be rotated to a co-ordinate scheme common to the shared virtual modelling space, using known techniques). Here, x and y are the pixel co-ordinates in the captured image (represented by notional screen C), and z is the associated depth or distance value for that pixel from the camera position A. Only one column of pixels (i.e. for a single value of x) have been projected in FIG. 4 for clarity, but it will be appreciated that all pixels of the image can be projected in this manner.

The result is that the pixels of each image will be positioned within the shared virtual modelling space at their correct position in 3D on the surface of a virtual object in the scene, as illustrated in FIG. 4 using the example of Blobman. As each image is projected into the shared virtual modelling space, more of the surface of each object in the scene will be 'painted-in' in this manner. Where two images project the same pixel onto the same point in 3D space, the second projected pixel may be discarded or may replace the first pixel.

It will be appreciated that pixels are two dimensional objects. Consequently in an embodiment of the present disclosure, when a pixel from an image is projected to a position $x_i$, $y_j$, $z_k$ in the shared virtual modelling space, in fact a voxel (a typically cubic 3-dimensional pixel) is created at that position, and the colour information associated with the projected pixel is used as the colour information for the voxel.

The effect is that a shell of voxels representing the visible surface of the virtual environment is built up by projecting the colour data of the image pixels in each image to x,y,z positions in the shared virtual modelling space.

It will be appreciated that instead of projecting plural images into a shared modelling space using the z-buffer depth information from the entertainment device, this depth information may be estimated using the previously discussed techniques of stereoscopic depth estimation and/or silhouette analysis and surface extrusion. Hence these techniques may also be used to drive the assembly of a voxel shell within a shared model space in the above described manner.

In any event, once all the images have been used, the resulting shell of voxels can be analysed for integrity. Any gaps in a surface (optionally below a threshold size) may be filled in by interpolation from the surrounding surface.

Having generated an estimate of the 3D shape of the environment in the form of the voxel shell, a 3D model can be generated for printing.

It will be appreciated that a model shell one voxel thick is unlikely to be strong enough when printed as a physical model.

Accordingly, the shell can be extruded to a predetermined thickness. The extrusion may be performed by adding adjacent voxels to each surface voxel on the side opposite to the side(s) from which they were projected into the shared virtual modelling space (i.e. on the inside or underside of the shell). The number of voxels added may be the lesser of M voxels or the number needed to reach an opposite existing surface of an object. M may be chosen to result in a thickness responsive to the weight and strength of the material being used to print the model.

Similarly, the lowest point within the (now extruded) model can be determined. At least two additional points, typically on the underside of the shell, can be extruded further to match the lowest point, thus providing at least three points of support for the physical model. Preferably, these points of support are distributed around a calculated centre of mass of the model.

In this way, a 3D model of the virtual environment can be constructed from plural in-game images that will stay up when physically printed and is viewable from a plurality of angles.

The model is then sent to a 3D printer driver, which slices the model into layers from the bottom up. These layers are then successively printed by the 3D printer as described previously.

Modifying the Model

As was noted previously, a common feature of video games is that the objects therein are not bounded by physical laws, which can impede successful 3D printing of videogame elements. One solution described above is to provide supplementary printer geometry that modifies videogame elements so that they can exist (i.e. support themselves) when printed.

Similarly, in an embodiment of the present disclosure, the voxel shell described previously is modified to take account of physical requirements of the 3D printed model.

As noted previously, the shell of voxels can be extruded to be M voxels thick, to provide some physical strength. This also addresses the problem of 2D objects within the environment, as the shell of voxels corresponding to these objects are extruded in the same as any other element of the shell of voxels.

However for some elements of the environment, this may not provide sufficient physical support, or in the case of aerial objects in the environment, support may be missing entirely.

Procedural Supplementary Geometry

Accordingly, procedurally defined modifications to the voxel shell may be provided for the purposes of 3D printing. These procedural modifications provide structural strength and/or physical support for some elements of the virtual environment that it would not otherwise be feasible to replicate in a 3D printed model. It will also be appreciated that these procedurally defined modifications can be applied to in-game geometry instead of or as well as using supplementary printer geometry.

Hence hereinafter whilst for simplicity of explanation references to 'printer geometry' refer to the voxels created to define the 3D model for printing, and examples of procedural supplementary geometry are based on analysis of the voxel shell, it will be appreciated that these may equally refer to in-game geometry (whether partially augmented by supplementary geometry or not).

Procedurally generated or modified printer geometry may be generated by the entertainment device once the initial voxel shell has been generated.

The voxel shell is analysed to detect whether additional geometry is required, according to several basic rules.

One analysis step is to detect whether there are unsupported objects within the environment.

If so, then these may be made subject to a de minimis size threshold so that objects below the threshold, such as for example snowflakes, bullets etc., are ignored and subsequently not retained within the 3D model. The associated voxels in the voxel shell may be deleted. Optionally this step may be implemented in a modified rendering process so that these items are never rendered in the first place when collecting images for the model, making the analysis of the images simpler.

Meanwhile for objects that meet the threshold, printer geometry for a support structure such as connecting rod may be procedurally generated between the object and a nearby anchor point, the anchor point being a part of the environment ultimately connected to the ground. The ground itself can be assumed to be connected to the lowest point of the voxel shell. Optionally the analysis can proceed from the lowest part of the voxel shell upwards so that unsupported objects can be sequentially supported, enabling them to support subsequent objects in turn.

Consequently where a video game character is leaping into the air for example, a supporting rod will be formed between the base of their foot and the ground by creating a cylinder of voxels, for example M voxels thick by default.

However, the thickness of the rod may also be procedurally determined according to basic rules. For a given type of printer, the weight by volume of common 3D printer materials and their compression and bending strengths will be known. In addition, the expected size of the printed model will be known. Accordingly, the entertainment device can estimate the weight of unsupported objects, and calculate the thickness of supporting rod needed to adequately support the object within the model. In particular where a connecting rod is partly or wholly lateral and hence may bend, the moment of the unsupported object is a function of its weight multiplied by its distance from the current position along the rod. Furthermore when constructing a connecting rod for such an object, the weight of the connecting rod itself may be a significant proportion of the weight. Consequently the rod may be thicker closer to the anchor point and taper towards the unsupported object as respective parts of the rod support a greater weight at the anchor point than at the unsupported object.

In another analysis step, the above principle can be applied to other parts of the voxel shell; for example a virtual model desk within a game may have legs that are too thin to support the total mass of the desk surface and any objects on the desk. For example, if the desk has a character standing on it, but the desk legs are only a few voxels thick, they may not be strong enough to support the physical model. Accordingly features of the voxel shell can be evaluated to determine the total weight they will be supporting in the model, and where this exceeds a safe margin for the cross sectional area of the voxel shell supporting this weight, this may be thickened by scaling up its cross-section and filling it with voxels. The principle may also for example be applied to trees within the environment, where the cumulative weight of branches and the trunk are used to locally modify the geometry of the branches or trunk to make their cross-section larger to accommodate the weight, in those circumstances where the existing geometry is locally insufficient to accommodate the weight when rendered as a 3D model using the particular materials associated with the 3D printer.

Subsequently, the centre of gravity of the adjusted model may be calculated to detect if it would fall over. If so, then either a support may be moved to restore stability, or optionally the voxel shell may be thickened in one or more selected places to alter the centre of gravity back to a stable position.

As noted previously, two-dimensional components of the environment are extruded along with other parts of the initial voxel shell to create a three-dimensional object with at least a minimum thickness. However, this extrusion process can be further modified as described below.

Figure 5A:
FIGS. 5 A-E are schematic diagrams illustrating a process of generating geometry for 3D printing in accordance with embodiments of the present disclosure.
Figure 5B:
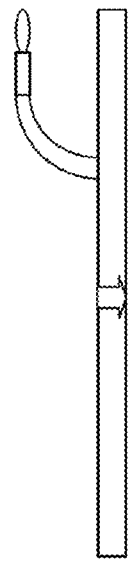
Figure 5C:
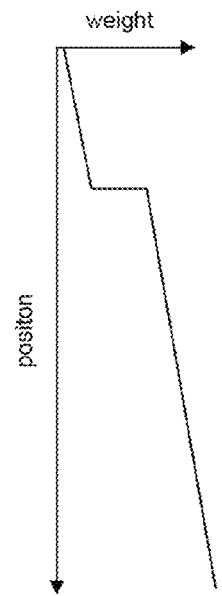

Referring now to FIGS. 5A-E, it will be seen that FIG. 5A represents a two-dimensional wall from the environment 200, upon which a candle and candlestick are placed within the game. FIG. 5B then illustrates an extrusion process to extend the wall in a direction normal to the wall plane and opposite to the side from which the image was projected, to procedurally generate geometry describing a wall with a predetermined thickness, for example of M voxels. However as can be seen in FIG. 5C, the cumulative weight of the physically printed wall will change according to the position on the wall, and also encounters a step change for parts of the wall additionally supporting the candle and candlestick. Accordingly, a wall of constant thickness may be unsuitable as the thickness of the wall near the base may be insufficient to adequately support the cumulative weight of the model.

Figure 5D:
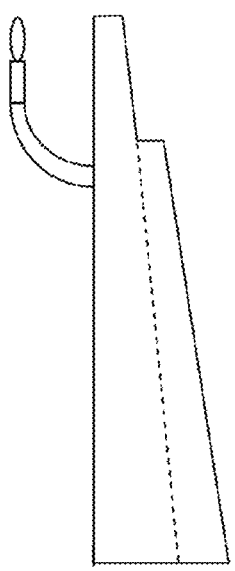
Figure 5E:
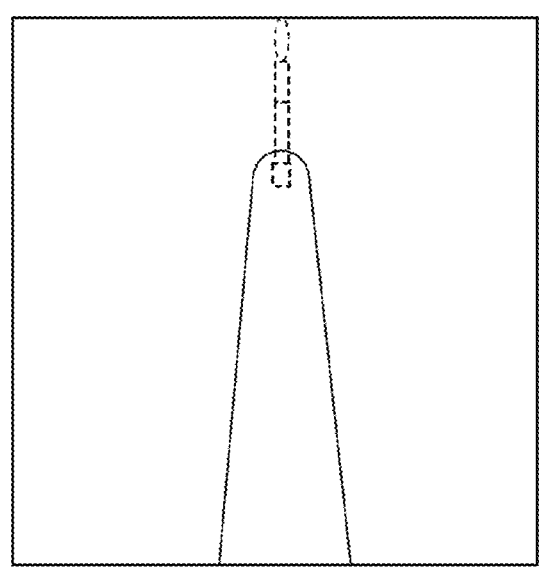

Accordingly, with reference to FIGS. 5D-E, then starting with a minimum preferred thickness of extrusion at the top of the wall, the thickness of the extrusion increases as a function of cumulative weight, resulting in a step change in thickness at the point of attachment of the candlestick to the wall to provide additional support. It will be appreciated that procedural rules may thicken a region around such points of attachment, such that the wall is thickened slightly before the load of the candlestick is applied to the wall, as illustrated in FIGS. 5D-E. In addition, the procedural rules may accommodate the additional mass of the supportive thickening itself when extruding lower portions of the wall. Finally, the load imposed by the candlestick and the supporting region may be distributed laterally as well as vertically, so that the thickened supporting region splays sideways as it propagates down the wall, as shown in FIG. 5E.

The procedural rules may also interact with additional information provided by a game developer, to assist in generating desirable supplementary geometry automatically.

Figure 6:
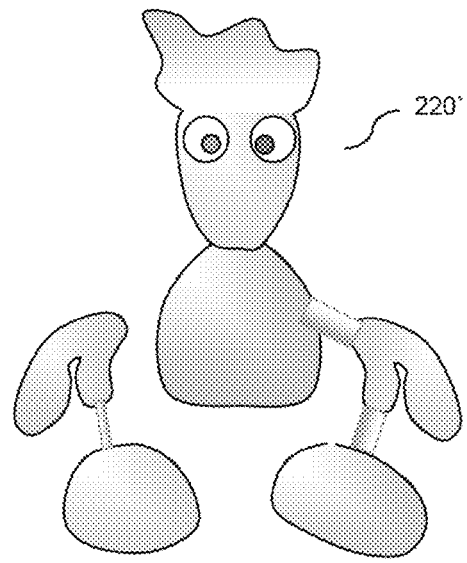
FIG. 6 is a schematic diagram of a 3D printable videogame character in accordance with embodiments of the present disclosure.

For example, the previously noted rule that a connecting rod is procedurally generated between an unsupported object and the nearest anchor point, where the anchor point is a part of the environment ultimately connected to the ground, may result in 3D model of Blobman 220' as illustrated in FIG. 6. It will be appreciated that when the character's hands are analysed, it is likely that they are closer to the character's feet than to the character's torso, and possibly also that the character's torso will not yet be connected to an anchor structure itself. Accordingly the procedural rules may attach the character's hand to the only grounded anchor points available, which are the feet; subsequently the torso may be anchored to the closest single anchor point, which is now one of the hands. The result is a structure that, whilst stable, does not conform anatomically to what the user might expect.

Figure 7:
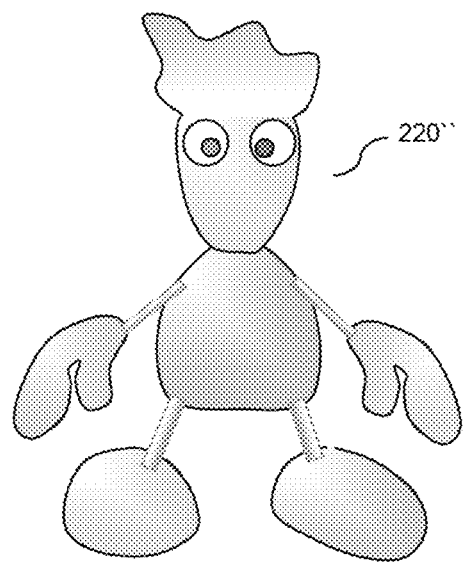
FIG. 7 is a schematic diagram of a 3D printable videogame character in accordance with embodiments of the present disclosure.

Accordingly, game developers (or users) may identify preferred points of connection between elements of the environment in order to guide the procedural generation of connecting rods or other connecting/support structures. These points of connection may be defined by use of a reserved value within one or more colour channels, enabling points of connection to be identified by use of a specifically coloured identifying pixel within an image; for example if the value 128 was reserved on the blue channel to denote a connecting point, then this can be used in the example of the Blobman character 220" of FIG. 7 to specify where preferred connecting points exist on the model. These reserved values are then used within the voxel shell, creating identifiable anchor points for use with the procedural rules. For example, matching values in the other two colour channels of the identifying pixel can be used to indicate paired connecting points, so that red and green values in the identifying pixel could be the same for the hand and the torso, causing these to be identified as sections to be connected together. In this way, artistic control of the placement of connecting structures can be maintained by the developers without the need for separate metadata. In the case of Blobman, this could be used to ensure an anatomically acceptable set of connecting rods, as can be seen in FIG. 7. Meanwhile, the rules for procedural generation of the connecting/support structure will still determine the required cross-section needed to adequately support the printed structure.

It will also be appreciated that for elements of the supplementary printer geometry not found in the rendered game (such as the connecting rods in the 'Blobman' example above), textures (colours) may be extrapolated from the existing voxel shell, or a no colour may be specified. In the case that colours are extrapolated, optionally the colours may be extrapolated from the portion of the structure supporting an element against gravity (e.g. the ground, or in the case of Blobman, from the feet to the torso, and from the torso to the hands and head, respectively), as this is likely to create the most unobtrusive supporting structure within the model. Alternatively in the case of using no texture, the bare plastic (or other 3D printer material) is left exposed, making it clear to the viewer that this is a functional support that is not part of the original image. Which approach is preferred may be an artistic decision for the user.

It will also be appreciated that the pixel resolution of the rendered images may be higher than the voxel resolution of the 3D printer at the scale chosen for printing. Consequently features of the rendered environment may sometimes have a high spatial frequency relative to the voxel resolution of the 3D printer. Accordingly the images may be filtered to a compatible resolution before projection into the shared virtual model space, to remove such high-frequency detail and thereby avoid aliasing effects in the resulting model. In this case, where reserved colour channel values are to be used by procedural rules, these are preserved or reinserted into the lower resolution image after filtration. The depth information may be similarly filtered.

Object Selection

The above discussion has assumed that a region of the virtual environment displayed to the user will be replicated as a 3D model. However, optionally the user may specify one or more objects in the environment for 3D printing alone; for example, the user may select to just print their avatar, or their avatar and an opponent.

This selection may be done for example by a user interface for defining a bounding box around the desired object(s), or by a user interface for indicating specific objects within the game environment using a cursor or reticule.

Where the object(s) are selected in this manner in isolation from a supporting surface, a default surface such as a flat panel may be generated having an area responsive to the size of the selected object(s). The selected object(s) can then be coupled to the support surface using the techniques described herein.

Editing

Once the printer geometry has been obtained using the above techniques as applicable, then optionally they may be transferred to an editing application for the user to preview or modify the model before sending it to the printer. For example it may be desired to review the model for possible errors, and/or to edit the pose and positioning of certain key characters. The editor may likewise enable the addition of decals, either purely to painted textures, or to the surface structure of objects for example by deleting surface voxels so that the user can effectively engrave messages into a surface of the model.

Final Print

Once the user is satisfied with their 3D model, it may be sent to the printer. As described previously, a printer driver analyses the model and divides it into layers of voxels for successive printing.

Where the printer is a domestic device either physically attached to the console or sharing a home network, then the printer driver may be implemented on the entertainment device, and the resulting drawing list is sent to the printer by the entertainment device.

However optionally a printing service may be provided by the entertainment device's network (that is to say, a network provided for example by the manufacturers of the entertainment device). This may allow access to a more expensive and sophisticated 3D printer than the average consumer could afford, and consequently a better quality model. In these circumstances either the printer driver may still be on the console, to distribute processing load among users, or may be at a central server connected to the 3D printer. In the first instance local printer drivers will generate drawing lists that may be sent securely to a central print queue server, together with meta data relating to the postal address of the user. In the second instance the entertainment device securely sends the 3D model printer geometry to a central printer driver that performs the relevant analysis to generate the required drawing lists before queueing them for printing. In either of these cases, printing of the model may be contingent upon the payment of a fee, for example via a payment card registered with the entertainment device's network, or similarly may be contingent upon the receipt of a voucher which might be earned for example as a trophy or other in-game award, or as part of the purchase price of a game, entitling the user to the creation of a predetermined number of 3D models from that game.

Waste Materials

It will be appreciated that 3D Printing techniques such as selective laser sintering can trap large quantities of the raw printer material inside the resulting model. This is because such techniques apply successive layers of powder across the top of the model during printing, fusing only a small proportion corresponding to the model's periphery but leaving the remaining powder inside that periphery untouched. The overall result is a volume of powder within which is a fused shell, with the powder outside that shell being removable, whilst the powder inside the shell is trapped.

This creates unnecessary costs in terms of wasted raw materials. It can also affect the balance of the resulting objects. Consequently it is commonplace to include vents or openings in models designed for 3D Printing to allow the waste powder to be poured or washed out.

However, such vents or openings are not present in videogame characters and are not desirable.

Accordingly, in an embodiment of the present disclosure, if a powder-based printer is to be used, a procedural rule is implemented to calculate the effective volume of space within objects in the printed scene. Where that volume exceeds a threshold amount, the object is treated as a hollow body and a procedural rule creates an opening in the voxel shell of the hollow body of a size that allows printer powder to flow out. Preferably, the opening is located on the underside of the hollow body and/or on a side facing away from the original viewpoint displayed on screen to the user when they indicated that they wanted to print the scene. The opening may be a hole in the voxel shell, or preferably an annular gap forming a ring or some other shape of closed loop. In the case of an annular gap, this results in a loose cover in the printed body that can be removed to allow the powder out, but which can then by adhered back onto the model, minimising the aesthetic impact of removing the powder on the finished object.

It will be appreciated that a 3D printed scene may comprise multiple such hollow bodies. For example, the scene may comprise the ground, a character such as Blobman, and a tree. The ground is typically an open shell.

Meanwhile the tree rests upon it, with the ground forming the base of the tree. Following calculations of the volume within the model, the tree trunk may be identified as a hollow object. Accordingly, a hole may be created in the ground beneath the tree, visible only if the model is viewed from the underside. By contrast, the Blobman character is supported by connecting rods above the ground. Consequently if the character torso is identified as a hollow object, an annular gap is included facing away from the original viewpoint, optionally at a position a threshold distance from any connecting rod. This allows the torso to be drained of powder but also to be repaired by affixing back in place the removable component of the torso created by the annular gap.

Optionally, the procedural rule may use features of the object itself to reduce the aesthetic impact of the hole or annular gap, for example by setting some or all of one or more edges of the hole or gap to follow adjacent a boundary between texture colours in a model, and/or to follow adjacent a ridge or other discontinuity in the model surface.

The system may use the 3D model data to estimate the volume of printer raw material needed, and provide a quote estimating the cost of printing the model before the user commits to doing so.

Scene/Object Selection

It will be appreciated that the above techniques are predicated upon the selection, by user, of a scene or character to print from within the videogame. Whilst in some games it may be possible for a user to adjust a pose of a favourite character in a manner they prefer without interference from other in-game events, it is more likely that memorable moments within a game are associated with frenetic activity on the part of the user and/or rapid action by in-game characters or environmental features of the game. During such moments the user may not be able to anticipate when to freeze the game action for the purposes of a selection, or may not have the reaction time necessary to freeze the game action the moment they decide that a displayed scene is desirable, particularly when games typically run at 30 or 60 frames per second.

Figure 8:
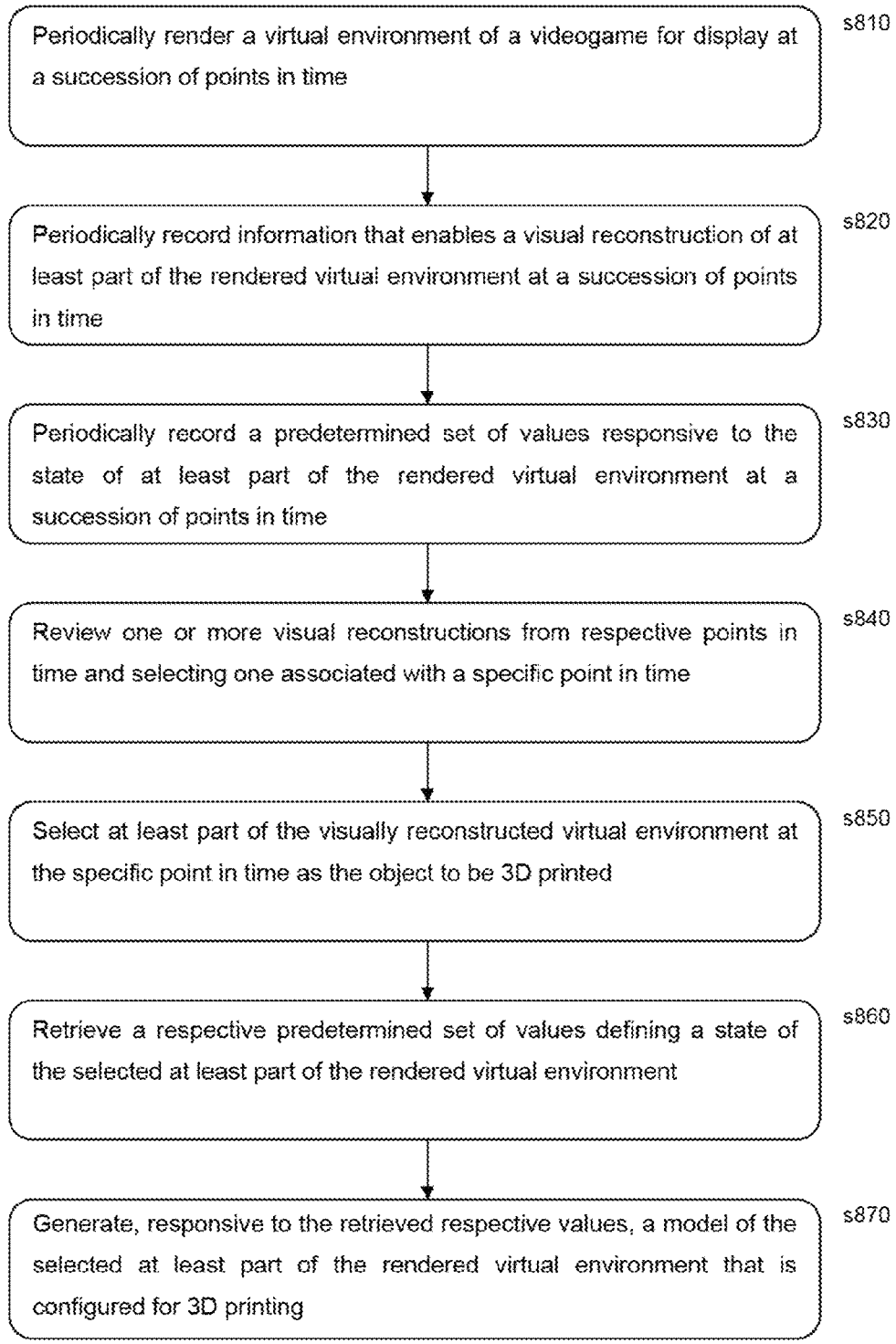
FIG. 8 is a flow diagram of a method of 3D printing a virtual environment in accordance with embodiments of the present disclosure.

Accordingly, referring now to FIG. 8, in an embodiment of the present disclosure a method of selecting an object from a videogame to be 3D printed comprises:

A first step s810 of periodically rendering a virtual environment of a videogame for display at a succession of points in time. As noted above, typically the period will be every thirtieth or sixtieth of a second.

A second step s820 of periodically recording information that enables a visual reconstruction of at least part of the rendered virtual environment at a succession of points in time. Typically the period will be the same as the rendering period, by may be every $N^{th}$ rendering period, where N is in the range 2-60.

The information that enables a visual reconstruction of at least part of the rendered virtual environment will typically take the form of a video capture of the rendered image. In turn this will typically take the form of hardware video encoding of the output video image by the device hosting the game (for example the PlayStation 4) to hard disk. Alternatively or in addition, the game itself may perform software video encoding or just dump the rendered video image to hard disk. In this latter case, software video encoding is likely to be processor intensive and so may be limited to those circumstances where spare processor capacity is available, whilst storage of raw video frames without encoding or with minimal encoding uses less processor resources but comparatively more memory, and so the number of frames of video that can be recorded may be much smaller in this latter case.

Alternatively or in addition, the videogame may store information allowing a reconstruction of the rendered image by the videogame itself, such as draw lists (instructions to a graphics card) and associated asset information and game state data to allow re-rendering of the game state at previous points in time.

A third step s830 of periodically recording a predetermined set of values responsive to the state of at least part of the rendered virtual environment at a succession of points in time. Again the periodicity will typically be the same as that for the recording of information to enable visual reconstruction.

As will be described later herein, these sets of values comprise values that relate to those parts of the rendered scene that may subsequently be generated as models for 3D printing using for example any of the techniques described previously herein. It will be appreciated, for example, that a video capture of the rendered image alone may be insufficient to generate a model of a video game character at a particular moment in time, and consequently information enabling reconstruction of that model will be needed in addition to the video capture.

It may then be assumed that at some point the user decides they wish to 3D-print a moment from the game. The user may indicate this wish by pressing a button on the controller, such as the pause button, to access the option to review one or more visual reconstructions from respective points in time and selecting one associated with a specific point in time.

In one instance, the game may provide the user with access its own video recordings or to re-rendering is of the scenes to the extent that its recorded information allows. This arrangement may be suitable for circumstances where a user's reaction times prevent them from selecting a momentary event as it happens, prompting them to 'rewind' by only a few seconds back to that event. As noted above, such video recordings or detailed visual reconstruction data is likely to be time-limited due to storage and processor constraints, and so in this instance, the game may only record sets of values for a predetermined number of points of time amounting to a period in the range of 1 to 60 seconds.

In another instance, the operating system of the host device may provide the user with access to encoded video recordings, either directly via the operating system interface or embedded within a user interface of the game. Because encoded video is much more compact than raw video, the host device may record for example 1, 3, 5, 10, or 15 minutes of displayed video in a rolling loop (depending on prior user settings). Longer recordings may be possible if storage capacity permits. It will be appreciated that where such video recordings are provided, a matching loop of predetermined sets of values are recorded in association. Consequently in this instance whilst the user may push a button to pause the game and access the above-mentioned rewind facility to review earlier moments from the game, optionally the user may wish to wait for a natural pause in a game such as the end of a level or a checkpoint before pushing such a button to review earlier moments in the game. Consequently the game user interface may also provide the review option as part of such an end of level or checkpoint notification. This allows a user to still access the 3D printing facility without interrupting frenetic gameplay action and hence their immersion within the game.

Having indicated a desire to review earlier moments from the game in a manner such as those described above, then a fourth step s840 comprises reviewing one or more visual reconstructions from respective points in time and selecting one associated with a specific point in time.

Hence as described above this may involve queueing and reviewing through recorded video of the game or re-rendered scenes of the game to identify a specific point in time comprising a scene or object of particular interest to the user.

In a fifth step s850 the user then selects at least part of the visually reconstructed virtual environment at the specific point in time as the object to be 3D printed. Which parts of the virtual environment can be selected may depend upon the quality of the predetermined set of values previously recorded, as discussed later herein. The interface for selection may be any suitable interface, such as a mouse or controller guided pointer that can be used to hover over and select one or more elements of the visually reconstructed virtual environment, with selection being successful for those elements that can be selected. Alternatively the selection techniques described herein relating to camera viewpoint and area around a nominated character such as the user's avatar may be used for example to select a more complete scene, which could be arduous to manually select using a point-and-click interface.

Hence in this way typically one or more game characters such as the user's avatar and/or non-player characters may be selected, and/or a given volume or area of a complete scene may be selected for printing.

A sixth step s860 then comprises retrieving a respective predefined set of values defining the state of the selected at least part of the rendered virtual environment. As noted above and as described in detail below the respective values may vary in quality and consequently the retrieval process may vary as a function of this quality.

It will be appreciated that if the respective values comprise data that serves to identify which element or elements of the at least part of the visually reconstructed virtual environment can be selected, then the step s860 of retrieving the respective predefined set of values for the specific point in time may precede the step s850 of selecting at least part of the visually reconstructed virtual environment at the specific point in time as the object to be 3D printed. More generally it will be appreciated that steps of the method described herein may be re-ordered or run concurrently in any suitable order that achieves substantially the same final outcome as the order described herein.

Finally, a seventh step s870 comprises generating, responsive to the retrieved respective values, a model of the selected at least part of the rendered virtual environment that is configured for 3D printing.

It will be appreciated that any of the techniques described previously herein may be used for this purpose, including the provision of supplementary geometry or the generation of additional geometry through procedural rules, and the automatic or manual editing of meshes to improve mesh integrity. It will also be appreciated that the generated model may be output to a 3D printer local to the host device, or the generated model (or suitable intermediate model data for generation of a model, such as that used as input to the techniques described herein) may be output to a third party printing service.

As was noted above, the predetermined set of values may have different quality levels corresponding to the fidelity with which the state of the game is recorded by those values at each point in time.

For the convenience of explanation, reference will be made to 'high quality', 'medium quality' and low quality' sets of values, but these may be equally thought of as respective sets of values of a first size, a second, smaller size and a third, yet smaller size. Hence these may also be respectively referred to as first, second and third quality sets of values, or datasets.

The high quality set of values may for example comprise a suitable selection of one or more selected from the list consisting of:

i. game specific values that would be sufficient to allow the particular game to reconstruct that point in time within the game, given the games' access to the game engine and game assets (e.g. similar to a game save);
ii. at least part of a drawing list sent to a graphics card at a point in time;
iii. one or more textures or identifiers of textures used by a graphics card at that point in time;
iv. mesh data corresponding to the state of at least part of the virtual environment at that point in time (for example as used in some of the above described 3D printing techniques), optionally including supplementary geometry;
v. Z-buffer information providing depth data (for example as used in some of the above described 3D printing techniques) at that point in time; and
vi. descriptors relating to the warping or modification of meshes, textures or any surface appearance, for example in relation to a particular in-game character.

The high quality set of values may use any suitable compression scheme to reduce data size, depending on available processor capacity; for example only saving a full high quality set of values every $M^{th}$ point in time, and relying on saving incremental or differential values in between.

It will be appreciated that the high quality set of can potentially enable a high fidelity reconstruction of the visible scene displayed to the user at the corresponding point in time (e.g. item i. in the above list), and hence may double up as the recorded visual representation.

It will also be appreciated that the high quality set of values may comprise sufficient assets to construct a desired 3D model without subsequent access to the game assets themselves, depending on the values included (for example items iii. and iv. above, or item v. in conjunction with video data); alternatively access to the game itself may be assumed (for example in the case of items i. and ii. above), or may be used to enhance the potentially independent data set.

The medium quality set of values may for example comprise a suitable selection of one or more selected from the list consisting of:

i. game specific values identifying a level or region of the game displayed at a particular point in time (for example; level 5, region 6, coordinates XYZ);
ii. game specific values that would be sufficient to allow the particular game to reconstruct the pose of a particular in-game character at a point in time;
iii. one or more textures or identifiers of textures used by a graphics card for a particular in-game character at that point in time;
iv. mesh data corresponding to that particular in-game character at that point in time, optionally including supplementary geometry;
v. Z-buffer information providing depth data corresponding to that particular in-game character at that point in time; and vi. descriptors relating to the warping or modification of meshes, textures or any surface appearance, for example in relation to a particular in-game character.

Again, the medium quality set of values may use any suitable compression scheme to reduce data size; for example only saving a full medium quality set of values every $M^{th}$ point in time, and relying on saving incremental or differential values in between.

It will be appreciated that the medium quality set of values typically enable a high fidelity reconstruction of a particular character displayed to the user at the corresponding point in time.

It will also be appreciated that the medium quality set of values may comprise sufficient assets to construct a 3D model of the particular character without subsequent access to the game assets themselves, depending on the values included (for example items iii. and iv. above, or item v. in conjunction with video data); alternatively access to the game itself may be assumed (for example in the case of items i. and ii. above), or may be used to enhance the potentially independent data set.

It will be appreciated that the medium quality set of values may capture information relevant to more than one character in a scene; for example whilst the user's avatar may be a default selection, information for non-player characters that the user interacts with at a particular point in time, or who are within a predetermined radius of the user's viewpoint or the user's avatar at that time may be included as part of the medium quality set of values.

It will also be appreciated that high quality and medium quality datasets may be interleaved; hence for example a high quality dataset may be recorded at a low frequency, in the order of seconds or minutes, providing information that would enable a representative reconstruction of the environment for a character reconstructed using medium quality data selected from a particular point in time occurring between low-frequency recordings of the high quality dataset. In this way a model of a scene capturing the precise desired pose of the main characters can be generated using less data storage.

The low quality set of values may for example comprise a suitable selection of one or more selected from the list consisting of:
i. values identifying a level or region of the game displayed at a particular point in time (for example; level 5, region 6, coordinates XYZ);
ii. values identifying a particular in-game character; and
iii. values identifying a particular predetermined state for the in game character at that point in time.

Again, the low quality set of values may use any suitable compression scheme to reduce data size; for example only saving a full low quality set of values every $M^{th}$ point in time, and relying on saving incremental or differential values in between.

It will be appreciated that the low quality set of values typically enable a high fidelity reconstruction of a particular character displayed to the user at the corresponding point in time, if that character adopts predetermined states known to the game, such as pre-set animation frames.

It will also be appreciated that the low quality set of values typically do not comprise sufficient assets to construct a 3D model of the particular character without subsequent access to the game assets themselves.

Again it will be appreciated that the low quality set of values may capture information relevant to more than one character in a scene; for example whilst the user's avatar may be a default selection, information for non-player characters that the user interacts with at a particular point in time, or who are within a predetermined radius of the user's viewpoint or the user's avatar at that time may be included as part of the medium quality set of values.

Again it will also be appreciated that high quality and medium quality datasets may be interleaved with low quality datasets. For example, an in-game character may use predetermined animation frames for the majority of point in time, but these may be modified using so-called 'ragdoll physics' in specific and dramatic circumstances such as explosions, falling or impacts. Consequently the predetermined set of values used may switch from low quality to medium quality, or incorporate medium quality elements, when the game switches from predetermined animation to ragdoll physics for a character.

Again the high quality dataset may be recorded at a low-frequency to provide representative background of the scene; however if access to game assets is assumed to be a requirement for low quality values, then values identifying the displayed location within the game at the point in time may be sufficient to allow reconstruction of the background if desired. Conversely it will be appreciated that if access to game assets is deemed necessary for 3D printing, then the medium quality datasets and high quality datasets may be simplified by use of such location data as well.

Any of the above sets of values may also incorporate information identifying the game, optionally including the game version (such as the platform the game is compiled for, and/or the particular iteration of the game on that platform).

As described previously, a common usage scenario for 3D printing using the above described techniques will be where a player of a videogame either pauses the game shortly after an exciting moment they wish to memorialise, or where the game comes to a natural pause at the end of a level or at a checkpoint, and during this pause the user then reviews the visual representation of the game to identify the particular moment in time.

In these circumstances, it may be straightforward to record a loop of data comprising values that may be used to form high-quality, medium quality and/or low quality datasets for a short period of time (in the order of a few seconds), for example by saving to RAM, which is fast but of limited capacity. Each predetermined set of values may have a time stamp or counter enabling it to be associated with a particular frame of recorded video or other visual representation of the displayed game image.

When an old set of values is to be overwritten in this loop, a high quality, medium quality and/or low quality dataset can be extracted from it and written to the hard drive with its timestamp or counter. Typically the hard drive is slower for writing but has much larger capacity. It will be appreciated that the loop of data can be written directly to the hard drive rather than RAM if this is achievable without compromising gameplay. It will also be appreciated that the loop of data can be written at the desired quality level or interspersed sequence of levels directly, rather than writing a loop comprising data that can be subsequently converted into a dataset of the desired quality level(s).

In either case, the data may be recorded by the videogame itself or by the operating system of the host platform (for example via a standardised data interface between the operating system and games that support the 3D printing facility described herein).

In any event, in these circumstances a 3D printing system hosted on the videogame platform will also have access to the predetermined set of values and optionally also to in-game assets on the videogame platform, whether this platform is a handheld or domestic videogame console or PC, or a cloud-based videogame platform such as one providing a video game streaming service to an end-user.

In addition, due to the capacity and writing speed of RAM and/or hard drives on the platform, high-quality or medium quality datasets may be easy to record at the desired frequency of points in time (as noted above, typically equal to the frame rate of the videogame).

Consequently, it is relatively straightforward for the 3D printing system, based upon the retrieved predetermined set of values, to collate the required information needed to generate a high quality model as described herein of at least a predetermined character, and optionally of a scene, corresponding to a particular point in time during the user's gameplay.

By contrast, another usage scenario makes this more difficult. It will be desirable for users to be able to export recorded video of their gameplay and associated predetermined sets of values to a third party hosting service such as Twitch® or YouTube®, so that other users could watch their gameplay and similarly select memorable moments during that gameplay for 3D printing. In these circumstances for example, and more generally, steps s810-s830 may be performed by a device hosting the videogame, whilst the remaining steps s840-870 may be performed by a second computing device belonging to the subsequent user (although in the case of game play provided by streaming video game images from a server, all the steps may still be by the same server).

Assuming that the 3D printing system itself is readily available (for example as part of the operating system or as a free or purchasable download) then in these circumstances there are two additional considerations.

The first consideration is that it is preferable for third-party systems to handle this information transparently. Consequently the associated predetermined sets of values may be incorporated into user data fields provided by a given video format, either directly or by using a universal resource locator (URL) that allows the 3D printing system to point to a server to which the associated predetermined sets of values have been uploaded, for example a server maintained by the 3D service, game publisher, operating system, and/or platform provider. The complete URL may as a non-limiting example take the form of a sequence of identifiers, such as http://www.exportserver.com/username/gamename/recordingID?framenumber.

In this case the only the username, game name and recording ID may be included, for example in video header data; the server address may be included with the 3D printing system software, and the frame number corresponding to the user's selected point in time can be calculated to construct the full correct URL. It will be appreciated that potentially a game name may not be needed in the URL if the recording ID is sufficiently unique on a per user-basis, and similarly a username may not be needed in the URL if the recording ID is sufficiently unique across the full user-base.

Where the predetermined set of values is incorporated into the data fields directly, then space constraints may determine what quality datasets can be used. By contrast where a URL is used, this space constraint is lifted.

Hence where a 'sharing' function is provided by the game and/or the operating system, this function may export video in a conventional manner, or where specified by a user, it may export video comprising predetermined sets of values where space within the video format permits, or it may export video comprising URL data and separately it may export predetermined sets of values to a server which then makes the values available at the corresponding URL.

The second consideration is that a random viewer of such a video may not have their own copy of the game. Consequently where the predetermined set of values stored in association with the video are of a type that assume access to videogame assets, this can potentially prevent such a viewer being able to generate a 3D model from a selected point in time within the video.

Accordingly, the 3D printing system may use information included in the predetermined set of values to identify as necessary, the game, and for a selected point in time, the location within the game, the character(s) within the game, and/or an animation frame for such a character. This information may then be sent as part of a request to a server maintained by the 3D service, game publisher, operating system, and/or platform provider, which may be the same as the server mentioned above or a different server. In response to the request, the server may send those game assets necessary to reconstruct that point in time for 3D printing; for example mesh data and optionally texture data for a specific game character, optionally for a specified pose.

Clearly, where the viewer of such a video does have their own copy of the game, then the 3D printing system may operate in a similar manner to the first usage scenario described above.

In either case, the 3D printing system can thus make use of available or provided in-game assets as necessary to generate a high quality model of at least a predetermined character, and optionally of a scene, corresponding to a particular point in time during the videoed gameplay.

It will be appreciated that other combinations of a videogame hosting device such as the PlayStation 4, and a server/cloud comprising relevant game assets, may be envisaged within the scope of the present disclosure.

For example, the videogame hosting device may host game assets used during gameplay, whilst the server/cloud holds game assets for a game enabled for 3D printing. In turn this may mean that it holds conventional game assets similar to those of the videogame hosting device and/or it may mean that it holds game assets specifically augmented or modified for the purposes of 3D printing, for example using one or more techniques described previously herein.

Using this arrangement, it is not necessary for the videogame hosting device to transmit game assets to the server/cloud, and the predefined set of values may thus comprise information identifying the relevant game, and identifying the relevant scene or character and any relevant pose data, for example in a manner described previously herein.

For example in an embodiment of the present disclosure, the game or the operating system on the videogame hosting device transmit the predefined set of values to the server/cloud and receives a uniform resource locator (URL) from the server/cloud pointing to a 3D printable version of the videogame scene or character generated by the server/cloud.

Typically this 3D printable version is constructed using techniques such as those described herein; using the predefined set of values, the relevant game assets are retrieved, and if necessary posed appropriately according to any supplied pose information in the predefined set of values; the server/cloud may then perform mesh repair, substitute elements of the mesh for versions adapted to 3D printing, or use procedural rules to adapt the mesh, generate supports for elements of the model, and/or adapt the model to allow for the recovery of waste printer material as described previously.

The URL may point to a data file in a format suitable for 3D printing, for example a format selected by the user when transmitting the predefined set of values, or may comprise parameter data stipulating a format to be used to create the data file when the URL is used to access the server/cloud.

In either case the 3D printable version of the videogame scene or character, and/or a data file for a 3D printable version may have digital rights management protection applies to it in any suitable form.

The data file may then be returned to the videogame hosting device if this is locally connected to a 3D printer or has means to forward the data file to a third party 3-D printing service, or the data file may be sent to a 3D printing service associated with the server/cloud.

Summary Embodiments

In a first summary embodiment of the present disclosure, a method of selecting an object from a videogame for 3D printing, comprises the steps of periodically rendering a virtual environment of a videogame for display at a succession of points in time (such as for example at the frame rate of the videogame); periodically recording information that enables a visual reconstruction of at least part of the rendered virtual environment at a succession of points in time (such as for example compressed or uncompressed video images, or game-specific data enabling a reconstruction of the displayed game—if this feature is available within the game); and periodically recording a predetermined set of values responsive to the state of at least part of the rendered virtual environment at a succession of points in time, the predetermined set of values enabling a model of a selected at least part of the rendered virtual environment to be generated that is configured for 3D printing. As described herein, such periodically recorded predetermined sets of values may have different levels of quality, these levels of quality may be interleaved in any suitable order during a recording sequence, and the set of values may require access to videogame assets either as part of a locally hosted game or accessed via a remote server, in order to enable the generation of a model for 3D printing, for example based upon the techniques described previously herein.

In a second summary embodiment of the present disclosure, a method of selecting an object from a videogame for 3D printing comprises the steps of reviewing one or more visual reconstructions of at least part of a rendered virtual environment of a videogame from respective points in time and selecting one associated with a specific point in time, as described previously herein; selecting at least part of the visually reconstructed virtual environment at the specific point in time as the object to be 3D printed (for example using a cursor or menu for selection purposes as previously described in); retrieving a respective predetermined set of values defining a state of the selected at least part of the rendered virtual environment (for example from local RAM or hard drive, or from data embedded within a video file or from data pointed to by data embedded within the video file); and generating, responsive to the retrieved respective values, a model of the selected at least part of the rendered virtual environment that is configured for 3D printing, for example using techniques previously described herein.

It will be appreciated that the first and second summary embodiments of the present disclosure may be implemented on a single device or on two or more separate devices, as described previously herein.

In instances of the above-described first and second summary embodiments, the predetermined set of values is of a first quality (e.g. 'high quality', as described herein) that comprises data useable to reconstruct the state of the at least part of the rendered virtual environment at the respective point in time. As noted previously, the data may directly enable reconstruction of the state of at least part of the rendered virtual environment at the respective point in time without access to in-game assets, or it may assume that access to in-game assets is possible.

In instances of the above-described first and second summary embodiments, the predetermined set of values is of a second quality (e.g. 'medium quality', as described herein) that comprises data useable to reconstruct the state of a specific in-game character within a reconstruction of the virtual environment at the respective point in time. As noted previously, the data may directly enable reconstruction of the specific game character at the respective point in time without access to in-game assets, or it may assume that access to in-game assets is possible.

In instances of the above-described first and second summary embodiments, the predetermined set of values is of a third quality (e.g. 'low quality', as described herein) that comprises data that identifies a state of a specific in-game character at the respective point in time. As noted previously, typically this data will assume that access to in-game assets is possible.

In an instance of the above-described first summary embodiment, the predetermined set of values is recorded by the videogame for a predetermined number of points in time. As described previously herein, the number of points in time may depend upon where the values are recorded (e.g. RAM versus HDD) and at what quality.

In an instance of the above-described first summary embodiment, the information that enables a visual reconstruction of at least part of the rendered virtual environment (for example, encoded video) is recorded by the operating system of a computing device hosting the videogame, for a predetermined number of points in time. As described previously, a device such as the PlayStation 4 can record 1, 3, 5, 10, or 15 minutes of video in a loop, or potentially more. The predetermined set of values saved by the game (or made available by the game to be saved by the operating system) can consequently also be stored in a corresponding loop.

In instances of the above-described first and second summary embodiments, predetermined sets of values in a sequence are associated with corresponding video images in a sequence, for export together to a third party host. As described previously herein, typically this may take the form of a low quality predetermined set of values being embedded within user fields or other available fields of encoded video data.

In instances of the above-described first and second summary embodiments, predetermined sets of values in a sequence are associated with corresponding video images in a sequence by an identifier incorporated into the video data, and the predetermined sets of values and video images are separately exported to one or more third party hosts. As described previously herein, typically this may take the form of an identifier forming part of a universal resource locator being embedded within user fields or other available fields of encoded video data, and the video data and predetermined sets of values being uploaded separately, typically to separate servers or optionally as separate entities to the same server where the server both provides a video review service and facilitates the 3D printing service.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Such a computer program may comprise computer software which, when executed by a computer, causes the computer to implement one or more of the methods as discussed above. Separately, such a computer program may be transmitted via data signals on a network such as an Ethernet, a wireless network, the Internet, or any combination of these of other networks.

With regards to the hardware, in a third summary embodiment of the present disclosure a videogame hosting device (such as a hand-held or domestic videogame console or a server providing a streaming game service) comprises a renderer (or rendering means) (such as APU 20) adapted or configured to periodically render a virtual environment of a videogame for display at a succession of points in time (for example at the videogame frame rate), a recorder (or recording means) (such as APU 20 in communication with RAM 22 or hard drive 37) adapted or configured to periodically record information that enables a visual reconstruction of at least part of the rendered virtual environment at a succession of points in time; and a recorder, or the same recorder (or recording means) (again such as APU 20 in communication with RAM 22 or hard drive 37) adapted or configured to periodically record a predetermined set of values responsive to the state of at least part of the rendered virtual environment at a succession of points in time, the predetermined set of values enabling a model of a selected at least part of the rendered virtual environment to be generated that is configured for 3D printing. As described herein, such periodically recorded predetermined sets of values may have different levels of quality, these levels of quality may be interleaved in any suitable order during a recording sequence, and the set of values may require access to videogame assets either as part of a locally hosted game or accessed via a remote server, in order to enable the generation of a model for 3D printing, for example based upon the techniques described previously herein.

In an instance of the third summary embodiment, the operating system of the videogame hosting device is adapted or configured to record the information that enables a visual reconstruction of at least part of the rendered virtual environment (for example, encoded video), for a predetermined number of points in time. As described previously, a device such as the PlayStation 4 can record 1, 3, 5, 10, or 15 minutes of video in a loop, or potentially more. The predetermined set of values saved by the game (or made available by the game to be saved by the operating system) can consequently also be stored in a corresponding loop.

In an instance of the third summary embodiment, the videogame hosting device comprises a transmitter (or transmitting means) (such as APU 20 in communication with Ethernet® 32 and/or Wi-Fi® 34), adapted or configured to associate a predetermined set of values in a sequence with corresponding video images in a sequence, and to transmit them together to a third party host. As described previously herein, typically this may take the form of a low quality predetermined set of values being embedded within user fields or other available fields of encoded video data.

In an instance of the third summary embodiment, the videogame hosting device comprises a transmitter (or transmitting means) (such as APU 20 in communication with Ethernet® 32 and/or Wi-Fi® 34), adapted or configured to associate a predetermined set of values in a sequence with corresponding video images in a sequence, by an identifier incorporated into the video data, and to transmit the predetermined sets of values and video images separately to one or more third party hosts. As described previously herein, typically this may take the form of an identifier forming part of a universal resource locator being embedded within user fields or other available fields of encoded video data, and the video data and predetermined sets of values being uploaded separately, typically to separate servers or optionally as separate entities to the same server where the server both provides a video review service and facilitates the 3D printing service.

In a fourth summary embodiment of the present disclosure, a computing device (which may be the same videogame hosting device as in the third summary embodiment, or a similar remote videogame hosting device, or a separate remote computing device), comprises reviewing logic (or means) (such as APU 20 communicates in with A/V Out 39) adapted or configured to output one or more visual reconstructions of at least part of a rendered virtual environment of a videogame for review from respective points in time, and an input (or input means) (such as APU 20 in communication with Bluetooth® input 33 and/or USB input 35, in turn communicating with input means such as a hand-held controller 43, or mouse 46) adapted or configured to select one associated with a specific point in time; the (or another) input (or input means) (20, 33, 35, 43, 46 as previously) being adapted or configured to select at least part of the visually reconstructed virtual environment at the specific point in time as the object to be 3D printed; retrieving logic (or means) (such as APU 20 in communication with RAM 22 and/or hard disk 37, for example in the case of the computing device being the same videogame hosting device as in the third summary embodiment, or Ethernet® input 32 or Wi-Fi® input 34 in the case of a different device) adapted or configured to retrieve respective values defining the state of the selected at least part of the rendered virtual environment; and a generator (or generating means) (such as APU 20 20) adapted or configured to generate, responsive to the retrieved respective values, a model of the selected at least part of the rendered virtual environment that is configured for 3D printing, for example using techniques previously described herein.

In instance of the fourth summary embodiment, the generator or generating means comprises a transmitter (or transmission means) (such as APU 20 in communication with Ethernet® 32 or Wi-Fi® 34) to transmit intermediate or complete model data to a remote 3D printing service. As described previously herein, it is envisioned that a user may have their own domestic 3D printer, in which case a complete model may be generated for that printer using the techniques described herein on the users local device, or the user may wish to use a third-party 3D printing service, in which case either a complete model may be generated in a similar manner on the users local device for transmission to the third party, or an intermediate model such as mesh and optionally texture data from the game may be sent to the third party, who may then complete the model using techniques such as those described herein before 3D printing the completed model.

It will be apparent that numerous modifications and variations of the present disclosure are possible in light of the above teachings. It is therefore to be understood that within the scope of the appended claims, the technology may be practiced otherwise than as specifically described herein.

Embodiments of the disclosure are defined by the following numbered clauses:

1. A method of selecting an object from a videogame for 3D printing, comprising the steps of:
   periodically rendering a virtual environment of a videogame for display at a succession of points in time;
   periodically recording information that enables a visual reconstruction of at least part of the rendered virtual environment at a succession of points in time;
   periodically recording a predetermined set of values responsive to the state of at least part of the rendered virtual environment at a succession of points in time, the predetermined set of values enabling a model of a selected at least part of the rendered virtual environment to be generated that is configured for 3D printing.
2. A method of selecting an object from a videogame for 3D printing, comprising the steps of:
   reviewing one or more visual reconstructions of at least part of a rendered virtual environment of a videogame from respective points in time and selecting one associated with a specific point in time;
   selecting at least part of the visually reconstructed virtual environment at the specific point in time as the object to be 3D printed;
   retrieving a respective predetermined set of values defining a state of the selected at least part of the rendered virtual environment; and
   generating, responsive to the retrieved respective values, a model of the selected at least part of the rendered virtual environment that is configured for 3D printing.
3. A method according to clause 1 or clause 2, in which the predetermined set of values is of a first quality that comprises data useable to reconstruct the state of the at least part of the rendered virtual environment at the respective point in time.
4. A method according to clause 1 or clause 2, in which the predetermined set of values is of a second quality that comprises data useable to reconstruct the state of a specific in-game character within a reconstruction of the virtual environment at the respective point in time.
5. A method according to clause 1 or clause 2, in which the predetermined set of values is of a third quality that comprises data that identifies a state of a specific in-game character at the respective point in time.
6. The method of clause 1, in which the predetermined set of values is recorded by the videogame for a predetermined number of points in time.
7. The method of clause 1, in which predetermined sets of values in a sequence are associated with corresponding video images in a sequence, for export together to a third party host.
8. The method of clause 1, in which predetermined sets of values in a sequence are associated with corresponding video images in a sequence by an identifier incorporated into the video data, and the predetermined sets of values and video images are separately exported to one or more third party hosts.
9. A computer program product for implementing the steps of any preceding method clause.
10. A videogame hosting device, comprising:
    rendering means adapted to periodically render a virtual environment of a videogame for display at a succession of points in time;
    recording means adapted to periodically record information that enables a visual reconstruction of at least part of the rendered virtual environment at a succession of points in time; and
    recording means adapted to periodically record a predetermined set of values responsive to the state of at least part of the rendered virtual environment at a succession of points in time, the predetermined set of values enabling a model of a selected at least part of the rendered virtual environment to be generated that is configured for 3D printing.
11. The device of clause 10, in which the operating system of the videogame hosting device is adapted to record the information that enables a visual reconstruction of at least part of the rendered virtual environment, for a predetermined number of points in time.
12. The device of clause 10, comprising
    a transmitting means adapted to associate a predetermined set of values in a sequence with corresponding video images in a sequence, and to transmit them together to a third party host.
13. The device of clause 10, comprising
    a transmitting means, adapted to associate a predetermined set of values in a sequence with corresponding video images in a sequence, by an identifier incorporated into the video data, and to transmit the predetermined sets of values and video images separately to one or more third party hosts.
14. A computing device, comprising:
    reviewing means adapted to output one or more visual reconstructions of at least part of a rendered virtual environment of a videogame for review from respective points in time, and input means adapted to select one associated with a specific point in time;
    input means adapted to select at least part of the visually reconstructed virtual environment at the specific point in time as the object to be 3D printed;
    retrieving means adapted to retrieve respective values defining the state of the selected at least part of the rendered virtual environment; and
    generating means adapted to generate, responsive to the retrieved respective values, a model of the selected at least part of the rendered virtual environment that is configured for 3D printing.
15. A computing device according to clause 14, in which the generating means comprises transmission means to transmit intermediate or complete model data to a remote 3D printing service.

The invention claimed is:

1. A method of recording virtual environment data from a videogame for subsequent 3D printing, comprising the steps of:
   periodically rendering, by one or more processors, a virtual environment of a videogame for display at a succession of points in time;
   periodically recording, by the one or more processors, a video image of at least part of the rendered virtual environment at a succession of points in time;
   periodically recording, by the one or more processors, a predetermined set of values responsive to a state of at least part of the rendered virtual environment at a succession of points in time, the predetermined set of values comprising data other than video images that enables a model of a selected at least part of the rendered virtual environment to be generated that is configured for 3D printing;
   associating each respective set of values with a corresponding recorded video image using an identifier incorporated within a data field in a video file; and outputting the video file comprising a plurality of the identifiers and the corresponding recorded video images.

2. A method of selecting an object from a videogame at a specific point in time for 3D printing, comprising the steps of:
reviewing, by one or more processors, one or more video images of at least part of a rendered virtual environment of a videogame from respective points in time and selecting one of the one or more visual reconstructions associated with a specific point in time;
selecting, by the one or more processors, at least part of the visually reconstructed virtual environment at the specific point in time as the object to be 3D printed;
retrieving a respective predetermined set of values, the set of values comprising data other than video image information, that define a state of the selected at least part of the rendered virtual environment; and
generating, by the one or more processors, responsive to the retrieved respective values, a model of the selected at least part of the rendered virtual environment that is configured for 3D printing.

3. A method according to claim 1, in which the predetermined set of values comprises data useable to reconstruct the state of the at least part of the rendered virtual environment at a respective point in time.

4. A method according to claim 1, in which the predetermined set of values comprises data useable to reconstruct the state of a specific in-game character within a reconstruction of the virtual environment at a respective point in time.

5. A method according to claim 1, in which the predetermined set of values comprises data that identifies a state of a specific in-game character at a respective point in time.

6. The method of claim 1, in which the predetermined set of values is recorded by the videogame for a predetermined number of points in time.

7. The method of claim 1, in which predetermined sets of values in a sequence are associated with corresponding video images in the sequence, for export together to a third party host.

8. The method of claim 1, in which predetermined sets of values in a sequence are associated with corresponding video images in the sequence by an identifier incorporated into video data, and the predetermined sets of values and video images are separately exported to one or more third party hosts.

9. A non-transitory machine-readable storage medium having computer-readable instructions stored thereon, the computer-readable instructions, when executed by a computer, cause the computer to implement a method of recording virtual environment data from a videogame for 3D printing, the method comprising:
periodically rendering a virtual environment of a videogame for display at a succession of points in time;
periodically recording reconstruction video image of at least part of the rendered virtual environment at a succession of points in time;
periodically recording a predetermined set of values responsive to a state of at least part of the rendered virtual environment at a succession of points in time, the predetermined set of values comprising data other than video images that enables a model of a selected at least part of the rendered virtual environment to be generated that is configured for 3D printing;
associating each respective set of values with a corresponding recorded video image using an identifier incorporated within a data field in a video file; and
outputting the video file comprising a plurality of the identifiers and the corresponding recorded video images.

10. A videogame hosting device, comprising:
a renderer configured to periodically render a virtual environment of a videogame for display at a succession of points in time;
a recorder configured to periodically record video images of the rendered virtual environment at a succession of points in time; to periodically record a predetermined set of values comprising data other than video images and responsive to a state of at least part of the rendered virtual environment at a succession of points in time, the predetermined set of values enabling a model of a selected at least part of the rendered virtual environment to be generated that is configured for 3D printing;
a processor configured to associate each respective set of values with a corresponding recorded video image using an identifier incorporated within a data field in a video file, and to output the video file comprising a plurality of the identifiers and the corresponding recorded video images.

11. The device of claim 10, in which an operating system of the videogame hosting device is configured to record the information that enables a visual reconstruction of at least part of the rendered virtual environment, for a predetermined number of points in time.

12. The device of claim 10, in which the recorded information comprises a sequence of video images, the device further comprising:
a transmitter configured to associate a predetermined set of values in a sequence with corresponding video images in the sequence, and to transmit the predetermined sets of values and corresponding video images to a third party host.

13. The device of claim 10, in which the recorded information comprises a sequence of video images, the device further comprising:
a transmitter configured to associate a predetermined set of values in the sequence with corresponding video images in a sequence, by an identifier incorporated into the video data, and to transmit the predetermined sets of values and video images separately to one or more third party hosts.

14. A computing device, comprising:
reviewing logic configured to output one or more video images of at least part of a rendered virtual environment of a videogame for review from respective points in time;
an input configured to select one associated with a specific point in time and to select at least part of the visually reconstructed virtual environment at the specific point in time as an object to be 3D printed;
retrieving logic configured to retrieve respective values, comprising data other than video image information, that define a state of the selected at least part of the rendered virtual environment; and
a generator configured to generate, responsive to the retrieved respective values, a model of the selected at least part of the rendered virtual environment that is configured for 3D printing.

15. The computing device of claim 14, in which the generator comprises a transmitter to transmit intermediate or complete model data to a remote 3D printing service.

* * * * *